US010726456B2

(12) United States Patent
Denton et al.

(10) Patent No.: US 10,726,456 B2
(45) Date of Patent: Jul. 28, 2020

(54) METHOD, APPARATUS, AND COMPUTER PROGRAM PRODUCT FOR PROVIDING A VIRTUAL AGGREGATION GROUP

(71) Applicant: Aptitude, LLC, Irving, TX (US)

(72) Inventors: Joel Walter Denton, Cedar Hill, TX (US); Troy Wayne Kirchenbauer, Hurst, TX (US); Russell Francis Lewis, Dallas, TX (US); John Walter Mallinckrodt, II, Dallas, TX (US); Patrick Robert Richer, Dallas, TX (US); Scott Michael Willey, Lewisville, TX (US)

(73) Assignee: APTITUDE, LLC, Irving, TX (US)

( * ) Notice: Subject to any disclaimer, the term of this patent is extended or adjusted under 35 U.S.C. 154(b) by 628 days.

(21) Appl. No.: 13/941,897

(22) Filed: Jul. 15, 2013

(65) Prior Publication Data
US 2015/0019361 A1 Jan. 15, 2015

(51) Int. Cl.
*G06Q 30/06* (2012.01)
(52) U.S. Cl.
CPC .................. *G06Q 30/0605* (2013.01)
(58) Field of Classification Search
CPC ................... G06Q 30/06; G06Q 30/08
USPC ................................ 705/26.1–27.2
See application file for complete search history.

(56) References Cited

U.S. PATENT DOCUMENTS

| 5,224,034 | A | 6/1993 | Katz et al. |
| 5,621,201 | A | 4/1997 | Langhans et al. |
| 5,970,475 | A | 10/1999 | Barnes et al. |
| 6,032,131 | A | 2/2000 | Vogel |
| 6,081,786 | A | 6/2000 | Barry et al. |
| 6,092,050 | A | 7/2000 | Lungren et al. |
| 6,604,089 | B1 * | 8/2003 | Van Horn et al. ........... 705/26.2 |
| 6,697,799 | B1 | 2/2004 | Neal |
| 7,043,492 | B1 | 5/2006 | Neal |

(Continued)

OTHER PUBLICATIONS

Nevada Ex Rel. *Steinke* v . *Merck Co*. 432 F. Supp.2d. 1082 (D. Nev. 2006), May 31, 2006.*

(Continued)

*Primary Examiner* — Ming Shui
(74) *Attorney, Agent, or Firm* — Greenberg Traurig, LLP

(57) ABSTRACT

Some examples provide systems, methods, apparatus, and computer program products for providing virtual aggregation groups using a market platform. An example method may include establishing, using a market platform, a virtual aggregation group comprising at least two members. The method may also include generating a committed pricing agreement between the virtual aggregation group and at least one supplier. The committed pricing agreement may include compliance terms that determine at least one price parameter for a product purchase by the at least two members of the virtual aggregation group from the supplier based on a market commitment of the virtual aggregation group. The method may further include monitoring spending of the members of the virtual aggregation group, determining, using the monitored spending, whether the virtual aggregation group has met the market commitment, and notifying the supplier or the members of the virtual aggregation group of whether the virtual aggregation group has met the market commitment.

39 Claims, 16 Drawing Sheets

(56) References Cited

U.S. PATENT DOCUMENTS

| | | |
|---|---|---|
| 7,146,331 B1 | 12/2006 | Young |
| 7,272,575 B2 | 9/2007 | Vega |
| 7,401,035 B1 | 7/2008 | Young |
| 7,475,034 B2 | 1/2009 | Cayne et al. |
| 7,542,958 B1 | 6/2009 | Warren |
| 7,637,426 B1 | 12/2009 | Green |
| 7,711,749 B2 | 5/2010 | Brodie |
| 7,870,012 B2 | 1/2011 | Katz et al. |
| 7,899,701 B1 | 3/2011 | Odom |
| 7,966,235 B1 | 6/2011 | Capelli et al. |
| 8,195,527 B2 | 6/2012 | Chowdhary |
| 8,417,715 B1 | 4/2013 | Bruckhaus |
| 8,620,773 B1 | 12/2013 | O'Neil |
| 8,626,692 B2 | 1/2014 | Bauer |
| 8,868,471 B1 | 10/2014 | Hullender |
| 2001/0047299 A1 | 11/2001 | Brewer et al. |
| 2002/0010686 A1* | 1/2002 | Whitesage ............... 705/80 |
| 2002/0026429 A1 | 2/2002 | Lostis et al. |
| 2002/0069079 A1 | 6/2002 | Vega |
| 2002/0077867 A1 | 6/2002 | Gittins |
| 2002/0133444 A1 | 9/2002 | Sankaran et al. |
| 2002/0174000 A1 | 11/2002 | Katz et al. |
| 2003/0033179 A1 | 2/2003 | Katz et al. |
| 2003/0069818 A1 | 4/2003 | Menninger |
| 2003/0069824 A1 | 4/2003 | Menninger |
| 2003/0074263 A1 | 4/2003 | Hoffman et al. |
| 2003/0074279 A1 | 4/2003 | Viswanath et al. |
| 2003/0177070 A1 | 9/2003 | Viswanath et al. |
| 2003/0208392 A1 | 11/2003 | Shekar et al. |
| 2004/0010463 A1 | 1/2004 | Hahn-Carlson et al. |
| 2004/0073457 A1 | 4/2004 | Kalies |
| 2004/0093326 A1 | 5/2004 | Carson |
| 2004/0172393 A1 | 9/2004 | Kazi |
| 2004/0220861 A1 | 11/2004 | Morciniec et al. |
| 2004/0220887 A1 | 11/2004 | Byde et al. |
| 2004/0225486 A1 | 11/2004 | Mullis et al. |
| 2004/0230512 A1 | 11/2004 | Gulati |
| 2005/0049938 A1 | 3/2005 | Venkiteswaran |
| 2005/0144122 A1 | 6/2005 | Creveling |
| 2006/0041496 A1 | 2/2006 | Amin |
| 2006/0047574 A1 | 3/2006 | Sundaram |
| 2006/0085544 A1 | 4/2006 | Chen et al. |
| 2006/0095333 A1 | 5/2006 | Gambhir |
| 2006/0200477 A1 | 9/2006 | Barrenechea |
| 2006/0206352 A1 | 9/2006 | Pulianda |
| 2006/0271405 A1 | 11/2006 | Cipolle et al. |
| 2007/0033098 A1 | 2/2007 | Peters et al. |
| 2007/0067218 A1 | 3/2007 | Bingham |
| 2007/0083650 A1 | 4/2007 | Collomb et al. |
| 2007/0106563 A1 | 5/2007 | Okada et al. |
| 2007/0136126 A1 | 6/2007 | Notani et al. |
| 2007/0156572 A1 | 7/2007 | Lites |
| 2007/0162303 A1 | 7/2007 | Wiley et al. |
| 2007/0208210 A1 | 9/2007 | Gelfand et al. |
| 2007/0240717 A1 | 10/2007 | Kaczka et al. |
| 2007/0250341 A1 | 10/2007 | Howe |
| 2007/0276710 A1 | 11/2007 | Hudgeon et al. |
| 2007/0288344 A1 | 12/2007 | Dalal et al. |
| 2007/0293932 A1 | 12/2007 | Zilla et al. |
| 2008/0010185 A1 | 1/2008 | Kirkpatrick |
| 2008/0077506 A1 | 3/2008 | Rampell et al. |
| 2008/0140492 A1 | 6/2008 | Rousso et al. |
| 2008/0167901 A1 | 7/2008 | Betz |
| 2008/0208616 A1 | 8/2008 | Young |
| 2009/0012854 A1 | 1/2009 | Altice |
| 2009/0055431 A1 | 2/2009 | Brodie |
| 2009/0055887 A1 | 2/2009 | Brodie |
| 2009/0089625 A1 | 4/2009 | Kannappan et al. |
| 2009/0125415 A1 | 5/2009 | Gindlesperger |
| 2009/0144117 A1 | 6/2009 | Cavander et al. |
| 2009/0216748 A1 | 8/2009 | Kravcik |
| 2009/0234710 A1 | 9/2009 | Belgaied Hassine et al. |
| 2009/0265279 A1 | 10/2009 | Mintz et al. |
| 2009/0288163 A1 | 11/2009 | Jacobson et al. |
| 2010/0005346 A1 | 1/2010 | Hamlescher et al. |
| 2010/0023340 A1 | 1/2010 | Chowdhary |
| 2010/0042431 A1 | 2/2010 | O'Connor et al. |
| 2010/0106652 A1 | 4/2010 | Sandholm et al. |
| 2010/0280963 A1 | 11/2010 | Fordyce, III et al. |
| 2010/0305975 A1 | 12/2010 | Daya |
| 2010/0325010 A1 | 12/2010 | Gindlesperger |
| 2010/0332311 A1 | 12/2010 | Jilk |
| 2011/0016407 A1 | 1/2011 | Nelson |
| 2011/0082723 A1 | 4/2011 | Governatori et al. |
| 2011/0131030 A1 | 6/2011 | McCoy et al. |
| 2011/0173093 A1 | 7/2011 | Psota |
| 2011/0246274 A1 | 10/2011 | Mesaros |
| 2012/0016764 A1 | 1/2012 | Ouimet |
| 2012/0029974 A1 | 2/2012 | Councill |
| 2012/0059680 A1 | 3/2012 | Guthrie et al. |
| 2012/0095949 A1 | 4/2012 | Bauer |
| 2012/0143721 A1 | 6/2012 | Hutchinson et al. |
| 2012/0203650 A1 | 8/2012 | Burlin |
| 2012/0203708 A1 | 8/2012 | Psota et al. |
| 2012/0203785 A1 | 8/2012 | Awada |
| 2013/0110606 A1 | 8/2013 | Seyhan et al. |
| 2013/0203025 A1 | 8/2013 | Cantrell et al. |
| 2013/0204670 A1 | 8/2013 | Chodavarapu et al. |
| 2013/0246118 A1 | 9/2013 | Dyess |
| 2013/0246127 A1 | 9/2013 | Denton |
| 2013/0246176 A1 | 9/2013 | Chang |
| 2013/0246217 A1 | 9/2013 | Denton |
| 2013/0246221 A1 | 9/2013 | Denton |
| 2013/0246237 A1 | 9/2013 | Dyess |
| 2014/0088981 A1 | 3/2014 | Momita |
| 2014/0143276 A1 | 5/2014 | Rogers et al. |
| 2014/0187213 A1 | 7/2014 | Shuster et al. |
| 2014/0188541 A1 | 7/2014 | Goldsmith et al. |
| 2014/0222444 A1 | 8/2014 | Cerello et al. |
| 2014/0266041 A1 | 9/2014 | Ghosh et al. |
| 2014/0316940 A1 | 10/2014 | Kirchenbauer |
| 2015/0180759 A1 | 6/2015 | Fallon |
| 2015/0193709 A1 | 7/2015 | Badu |
| 2015/0301698 A1 | 10/2015 | Roques |
| 2016/0080422 A1 | 3/2016 | Belgodere et al. |
| 2016/0255466 A1 | 9/2016 | Shuster et al. |
| 2016/0378918 A1 | 12/2016 | Vandermolen |
| 2016/0379158 A1 | 12/2016 | Vandermolen |
| 2018/0144428 A1 | 5/2018 | Dyess |

OTHER PUBLICATIONS

U.S. Appl. No. 13/765,271, filed Feb. 12, 2013. First named inventor: Dyess.
U.S. Appl. No. 13/765,443, filed Feb. 12, 2013. First named inventor: Denton.
U.S. Appl. No. 13/765,479, filed Feb. 12, 2013. First named inventor: Denton.
U.S. Appl. No. 13/765,507, filed Feb. 12, 2013. First names inventor: Dyess.
U.S. Appl. No. 13/835,878, filed Mar. 15, 2013. First names inventor: Denton.
U.S. Appl. No. 13/867,035, filed Apr. 29, 2013. First names inventor: Kirchenbauer.
Office Action for U.S. Appl. No. 13/765,507; dated Jun. 20, 2014.
Office Action for U.S. Appl. No. 13/765,271; dated Nov. 18, 2014.
Office Action for U.S. Appl. No. 13/765,507; dated Jan. 30, 2015.
Office Action for U.S. Appl. No. 13/765,479; dated Feb. 11, 2015.
Office Action for U.S. Appl. No. 13/765,443; dated Mar. 2, 2015.
Office Action for U.S. Appl. No. 13/765,271; dated Apr. 24, 2015.
Office Action for U.S. Appl. No. 13/765,271; dated Aug. 25, 2015.
Office Action for U.S. Appl. No. 13/765,507; dated Oct. 9, 2015.
Office Action for U.S. Appl. No. 13/765,479; dated Oct. 7, 2015.
Office Action for U.S. Appl. No. 13/835,878; dated Oct. 5, 2015.
Office Action for U.S. Appl. No. 13/765,271; dated Feb. 22, 2016.
Office Action for U.S. Appl. No. 13/835,878; dated Jun. 3, 2016.
Office Action for U.S. Appl. No. 13/765,479; dated Jun. 23, 2016.
Office Action for U.S. Appl. No. 13/765,507; dated Aug. 25, 2016.
Office Action for U.S. Appl. No. 13/765,271; dated Sep. 15, 2016.

(56) References Cited

OTHER PUBLICATIONS

Notice of Related Applications as filed for U.S. Appl. No. 13/941,897; dated Jun. 4, 2019; 3 pages; US.

* cited by examiner

METHOD, APPARATUS, AND COMPUTER PROGRAM PRODUCT FOR PROVIDING A VIRTUAL AGGREGATION GROUP

TECHNOLOGICAL FIELD

Example embodiments of the present invention relate generally to computer-provided services and, more particularly, to systems, methods, apparatuses, and computer program products for a market platform.

BACKGROUND

Advances in information technology have revolutionized some product supply chains. So-called enterprise resource planning (ERP) systems provide users with the capability to link various elements of product/service supply chains by providing a single data repository of manufacturing, accounting, sales, and customer relationship management. However, these systems are typically only useful for supply chains with defined, predictable, product sourcing arrangements. For example, such systems may be optimized for scenarios in which a buyer contracts to buy a defined number of products, and the buyer receives a discount based on the volume of their order.

In some industries, buyers are unable to plan their supply needs in advance with any particular level of certainty. For example, healthcare organizations (HCOs) typically run through particular medical supplies as they receive patients that require those supplies. It can be difficult, if not impossible, to predict the volume of such supplies that will be needed, as that would also require accurate prediction of which patients will get sick, in what way, and when. Additionally, some functionally equivalent products may have equivalents supplied by multiple suppliers. For example, latex surgical gloves may be marketed by several different suppliers under different brand names, even though the product is interchangeable across suppliers. One way that HCOs and other buyers with highly variable product needs have addressed the unpredictability of sales volume and the interchangeability of the products is to receive market-share based pricing from suppliers. For example, while the buyer may not be able to guarantee a particular volume, they may be able to guarantee that they will purchase 80% of products within a particular group of products from a particular supplier. In exchange, the supplier may offer the buyer a particular discount as long as the buyer meets their commitment to buy 80% of the products within the particular group of products from that particular supplier. For the purposes of this application, the term "products" is intended to have broad meaning, including but not limited to tangible and intangible goods both within and outside of the healthcare domain. Examples of these products may include medical supplies and devices, physician preference items, pharmaceuticals, capital, services, and the like.

Suppliers may frequently offer increased values to buyers that can meet particular spending or unit volume commitments, as lost revenue due to reduced margins may be made up for by gained revenue due to increased sales volume. However, these discounts may be unavailable to smaller buyers that do not have enough volume to make these agreements worthwhile for suppliers. In order to attempt to gain the benefits of such volume pricing deals, some buyers have entered into legal relationships with one another to pool spending. These formal associations allow member organizations to combine their spending in the expectation that greater spending will result in lower contract prices for certain purchases. However, there are difficulties associated with these entities including, but not limited to, the fact that these groups require each member to form some type of legal partnership and adhere to a common set of contractual provisions. These groups are static, such group members are bound to the decisions of the group for the duration of the agreement even if the priorities of the individual buyer no longer align with the remainder of the group. Decision-making by such groups is typically a cumbersome and time-consuming process which tends to be driven by group members with the largest spending volume, often leaving smaller volume members with limited ability to influence group decisions. In some aggregation groups, members that are completely compliant with all group decisions and contract commitments are penalized due to the non-compliant activities of other group members. Governance of these groups may be time consuming in and many cases involve numerous activities that are secondary to the goal of optimizing purchasing.

Therefore, a need exists for a market platform that provides buyers with the ability to enter virtual aggregation groups to provide buyers with a flexible, robust platform for obtaining optimal volume discounts while avoiding many of the difficulties associated with known formal associations.

SUMMARY

Some example embodiments provide systems, methods, apparatus, and computer program products for providing virtual aggregation groups using a market platform. The market platform may operate to inform buyers and suppliers, to allow buyers and suppliers to select products and contracting parameters to meet their needs, to allow buyers and suppliers to commit to supply agreements, and to monitor compliance with and enforce those supply agreements. These embodiments may provide such an integrated system by receiving buyer spend data, generating a request for pricing, receiving contract offers from one or more suppliers based on the spend data, allowing the buyer to select one or more of the contract offers, and monitoring spend data to inform and/or enforce compliance with the selected contract offer. The system may include dynamic pricing models, altering the price of the purchased products based on compliance with the selected contract offer. The system may also allow for various contracting models for managing the pricing of products or providing other financial benefits to buyers and/or suppliers based on the contractual terms agreed to by the buyer and supplier. These financial benefits may include price discounts, rebate payments, escrow refunds, insurance premiums or benefits, or any other type of financial benefit agreed to by the buyer and supplier. The system may also provide the buyer with a plurality of contracting options across plurality of suppliers, including determining an optimal contracting mix for the buyer based on one or more criteria, such as minimizing aggregate cost, minimizing the number of suppliers, minimizing product conversions maintaining relationships with one or more preferred suppliers, or the like. In this manner, embodiments may provide a complete, closed-loop market ecosystem that benefits both buyers and suppliers.

Embodiments may further provide buyers with the ability to enter into "virtual aggregation groups". These virtual aggregation groups may be collections of buyers that utilize the market platform to engage in one or more collective purchase contracts. The market platform may function to enable buyers to receive the benefits of joining an aggregation group without requiring the buyer to have any direct contact with other buyers. For example, the market platform may perform management, contracting, and compliance operations for the virtual aggregation group without the buyer having to interact with other members of the virtual aggregation group. In some embodiments, the buyer may obtain the benefit of joining a virtual aggregation group merely be selecting an interface option to "opt in" to group pricing, without the need to engage with other buyers or particular suppliers to establish the virtual aggregation group. In some other embodiments, the market platform may function to facilitate interaction between buyers to aid in the establishment of virtual aggregation groups. For example, the market platform may identify groups of buyers with similar bid calendars for the same categories of products, and suggest to those buyers that they should consider joining or forming a virtual aggregation group. In some embodiments, the market platform may assist buyers with creation of these virtual aggregation groups by providing interfaces to enable buyers to enter joint purchasing agreements with one another and with suppliers. The market platform may further monitor and enforce compliance with these agreements by monitoring the spending of members of the virtual aggregation group and determining the compliance of the group based on the monitored spending. In some embodiments, the market platform may further enforce compliance within the virtual aggregation group, by distributing the impact of under-compliance or over-compliance on members of the virtual aggregation group in accordance with the compliance level of the particular members of the virtual aggregation group.

In some embodiments, virtual aggregation groups may be related to a particular product or category of products. For example, buyers may be members of multiple virtual aggregation groups with different buyer members, with each aggregation group associated with a different product, category of products, or any other grouping of products.

Embodiments may include methods, apparatuses, and computer readable media for implementing virtual aggregation groups. Example embodiments may include a method, apparatus and computer readable medium for performing contracting operations for a virtual aggregation group. The method, apparatus, and computer readable medium may function by establishing a virtual aggregation group comprising at least two members, and generating, a committed pricing agreement between the virtual aggregation group and at least one supplier. The committed pricing agreement may include compliance terms that determine at least one price parameter for a product purchase by the at least two members of the virtual aggregation group from the supplier based on a market commitment of the virtual aggregation group. These embodiments may also include monitoring spending of the members of the virtual aggregation group, determining, using the monitored spending, whether the virtual aggregation group has met the market commitment, and notifying at least one of the supplier or the members of the virtual aggregation group of whether the virtual aggregation group has met the market commitment.

Embodiments may also include methods, apparatuses, and computer readable media for processing a request for pricing on behalf of a virtual aggregation group. These embodiments may include methods, apparatuses, and computer readable media configured for generating a group request for pricing (RFP) for a virtual aggregation group comprising a plurality of members, and receiving at least one pricing proposal from at least one supplier. The at least one pricing proposal may include compliance terms that determine at least one price parameter for a product purchase. These embodiments may also be configured for providing the at least one response to the plurality of members, receiving an indication of agreement to the response from at least one of the plurality of members, and generating a committed pricing agreement in response to receiving the indication of agreement.

Yet further embodiments may include methods, apparatuses, and computer readable media for forming virtual aggregation groups. These embodiments may include methods, apparatuses, and computer readable media configured for receiving an indicator from a buyer. The indicator may indicate a request by the buyer to join a virtual aggregation group for purchasing at least one product from at least one supplier. The embodiments may be further configured for, in response to receiving the indicator, assigning the buyer to a virtual aggregation group based on one or more characteristics of the buyer using a processor, sending a request for pricing (RFP) to the at least one supplier on behalf of the virtual aggregation group, receiving a response to the RFP from the at least one supplier, and providing the response to a plurality of members of the virtual aggregation group, the plurality of members including at least the buyer.

Further embodiments may include methods, apparatuses, and computer readable media for forming virtual aggregation groups using analytics data. These embodiments may be configured for monitoring buyer spending using a market platform, determining buyer analytics from at least the buyer spending using a processor, using the buyer analytics to identify at least one buyer as a candidate for joining a virtual aggregation group, generating an invitation to the virtual aggregation group, sending the invitation to the buyer, receiving an indicator of acceptance of the invitation, in response to receiving the indicator of acceptance, adding the buyer to the virtual aggregation group, and generating a request for pricing to one or more suppliers on behalf of the virtual aggregation group.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the disclosure in any way. It will be appreciated that the scope of the disclosure encompasses many potential embodiments, some of which will be further described below, in addition to those here summarized.

BRIEF DESCRIPTION OF THE DRAWINGS

Figure 1:
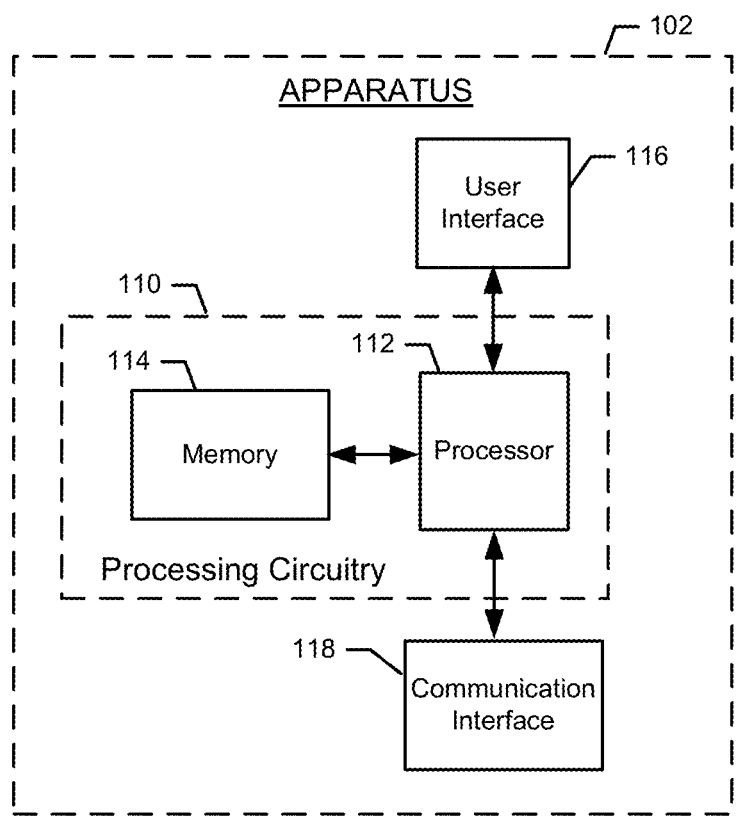
Figure 2:
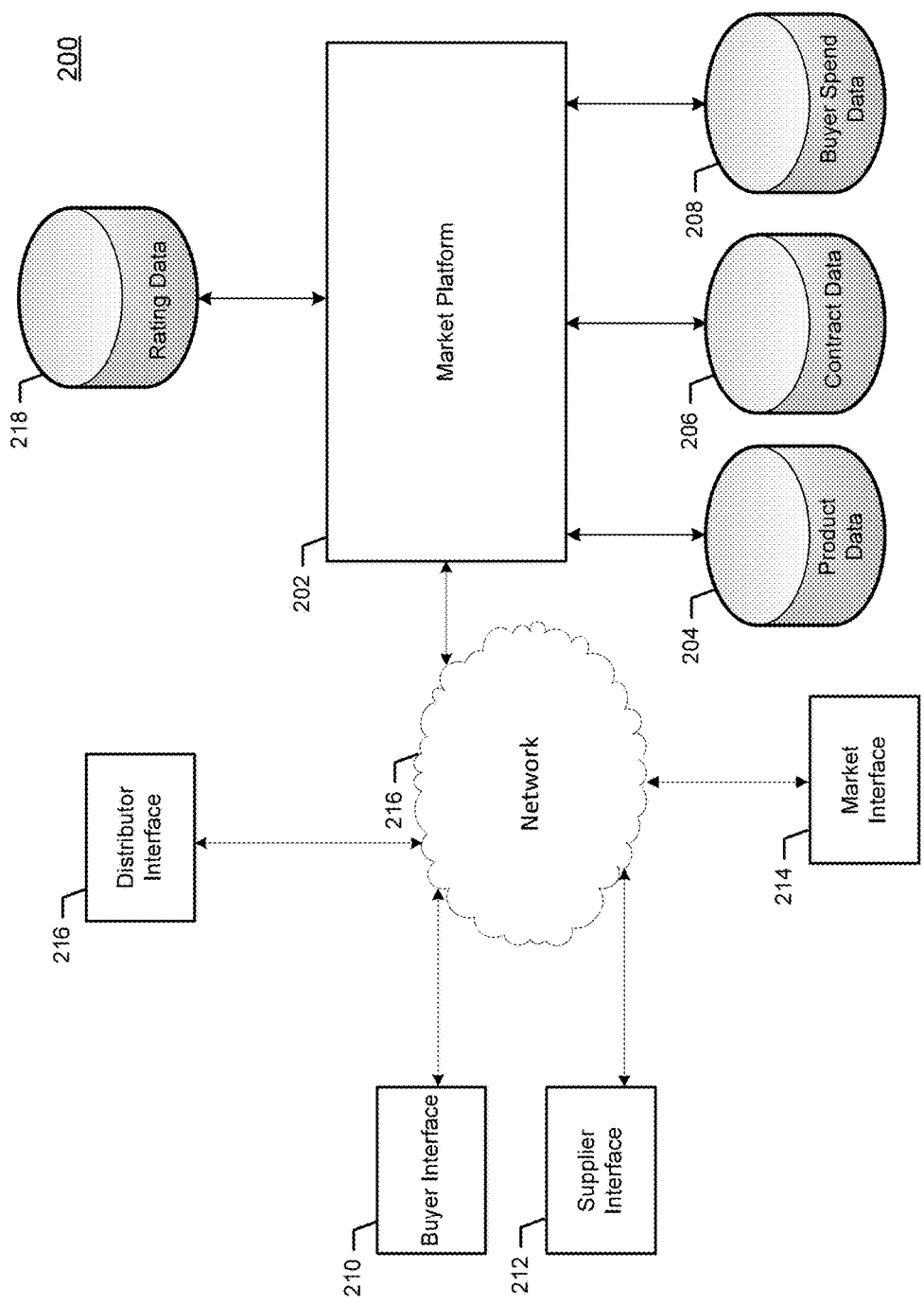
Figure 3:
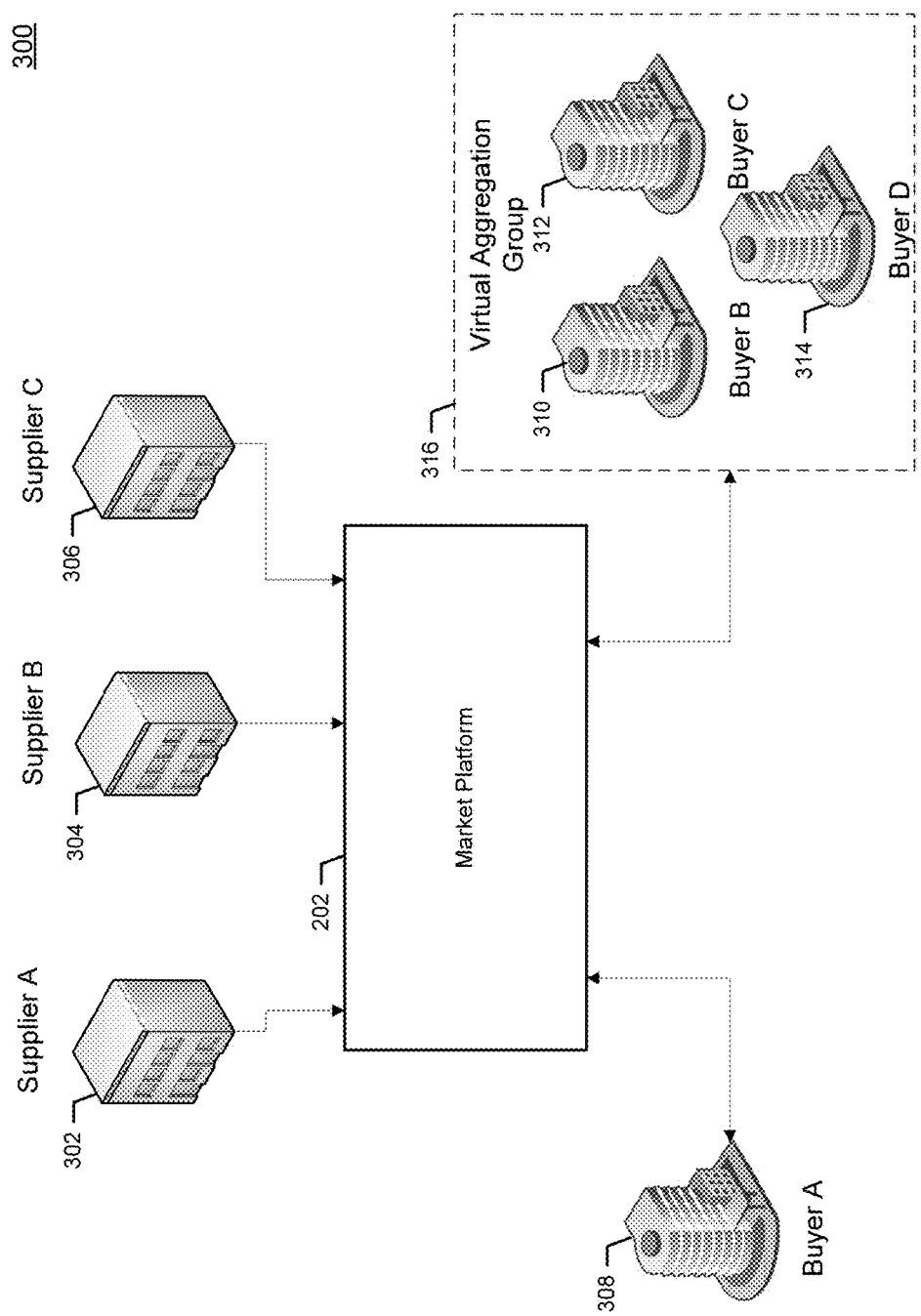
Figure 4:
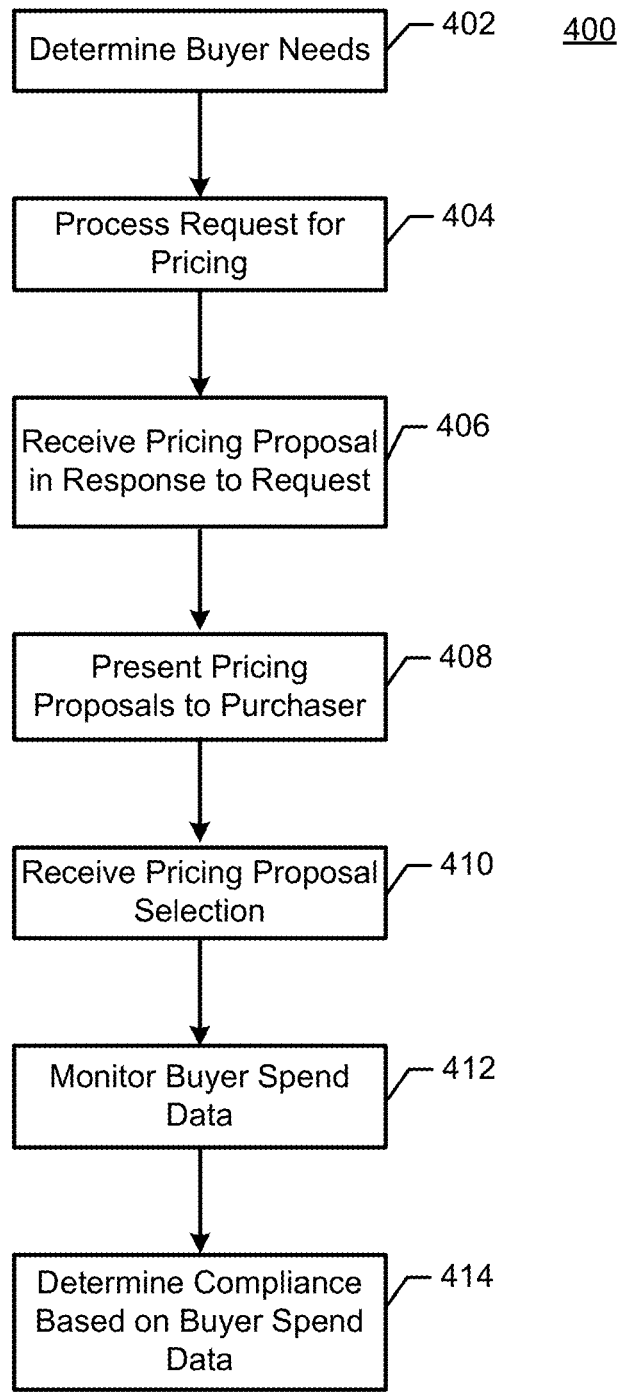
Figure 5:
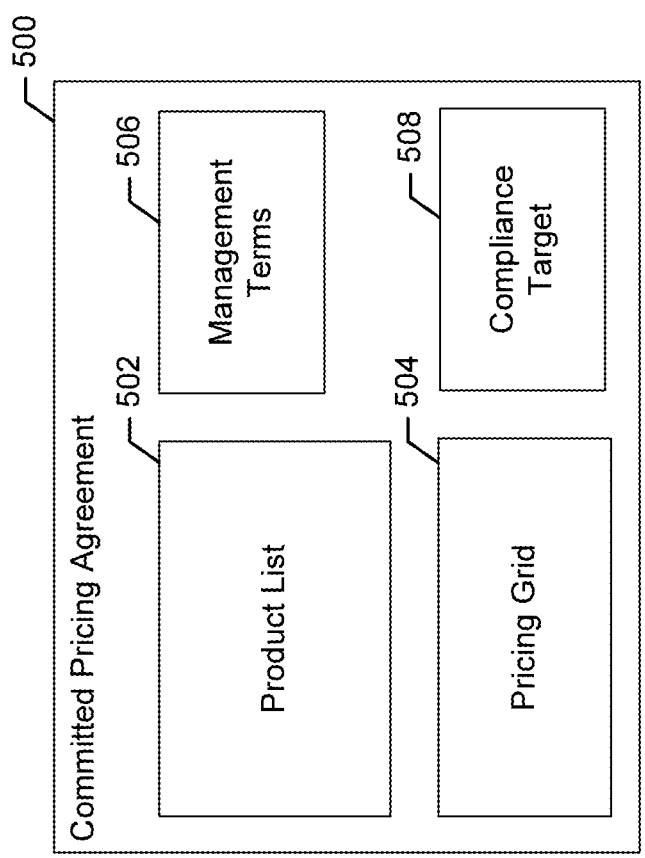
Figure 6:
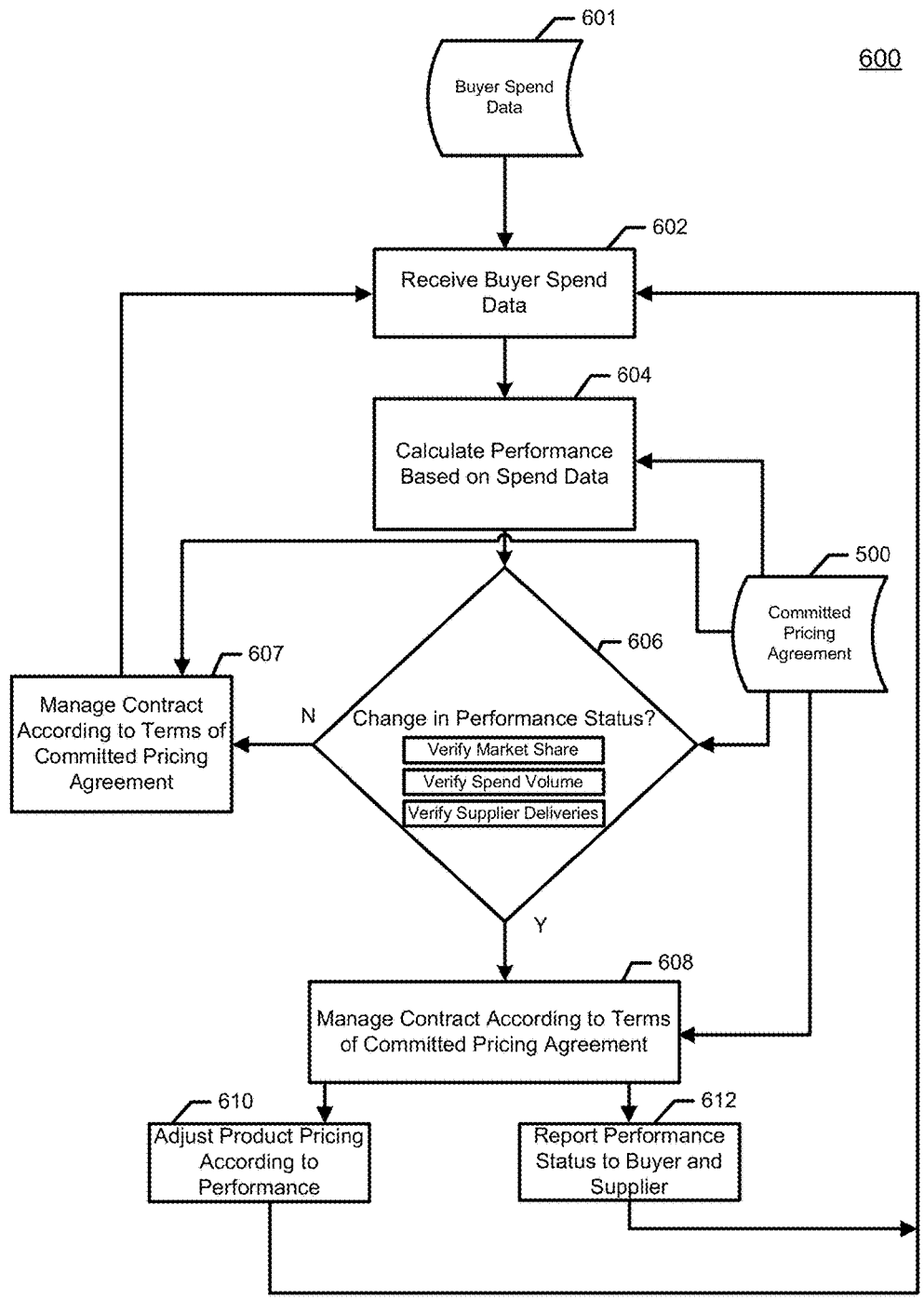
Figure 7:
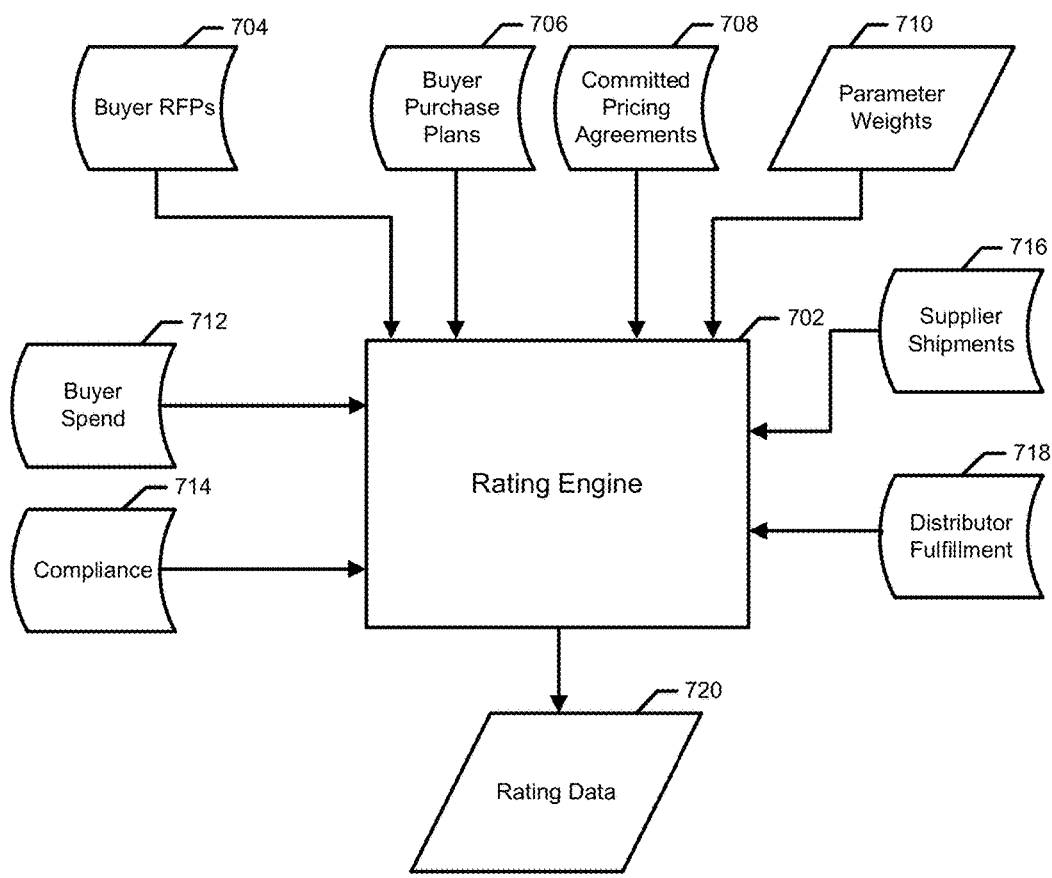
Figure 8:
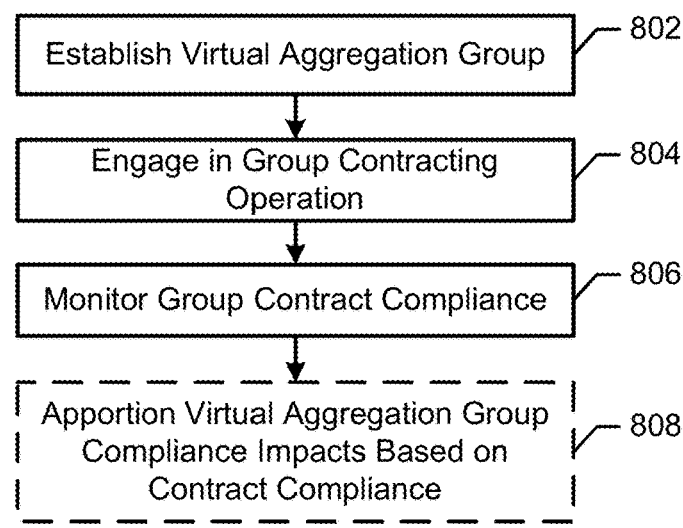
Figure 9:
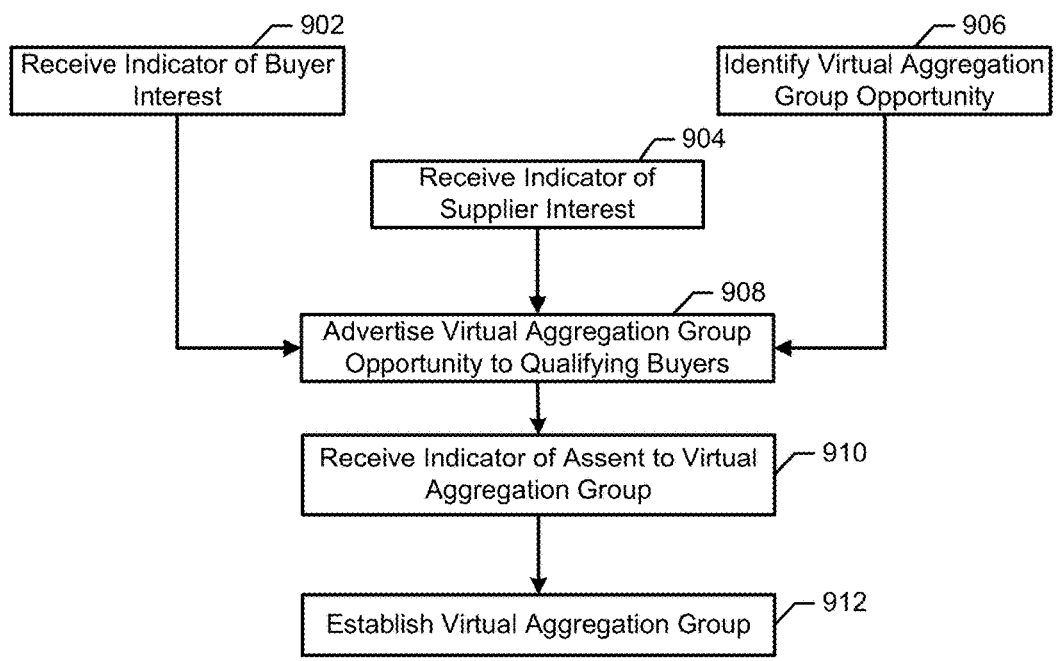
Figure 10:
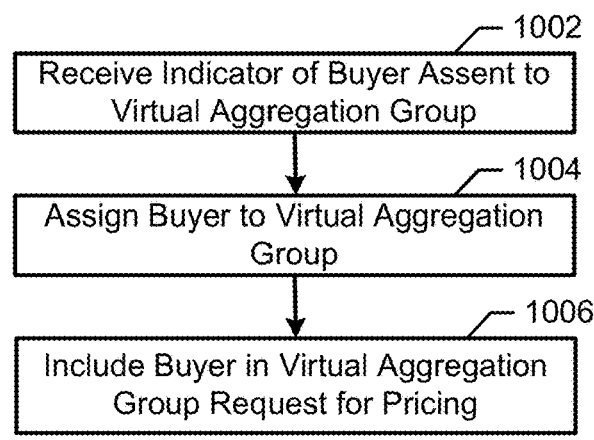
Figure 11:
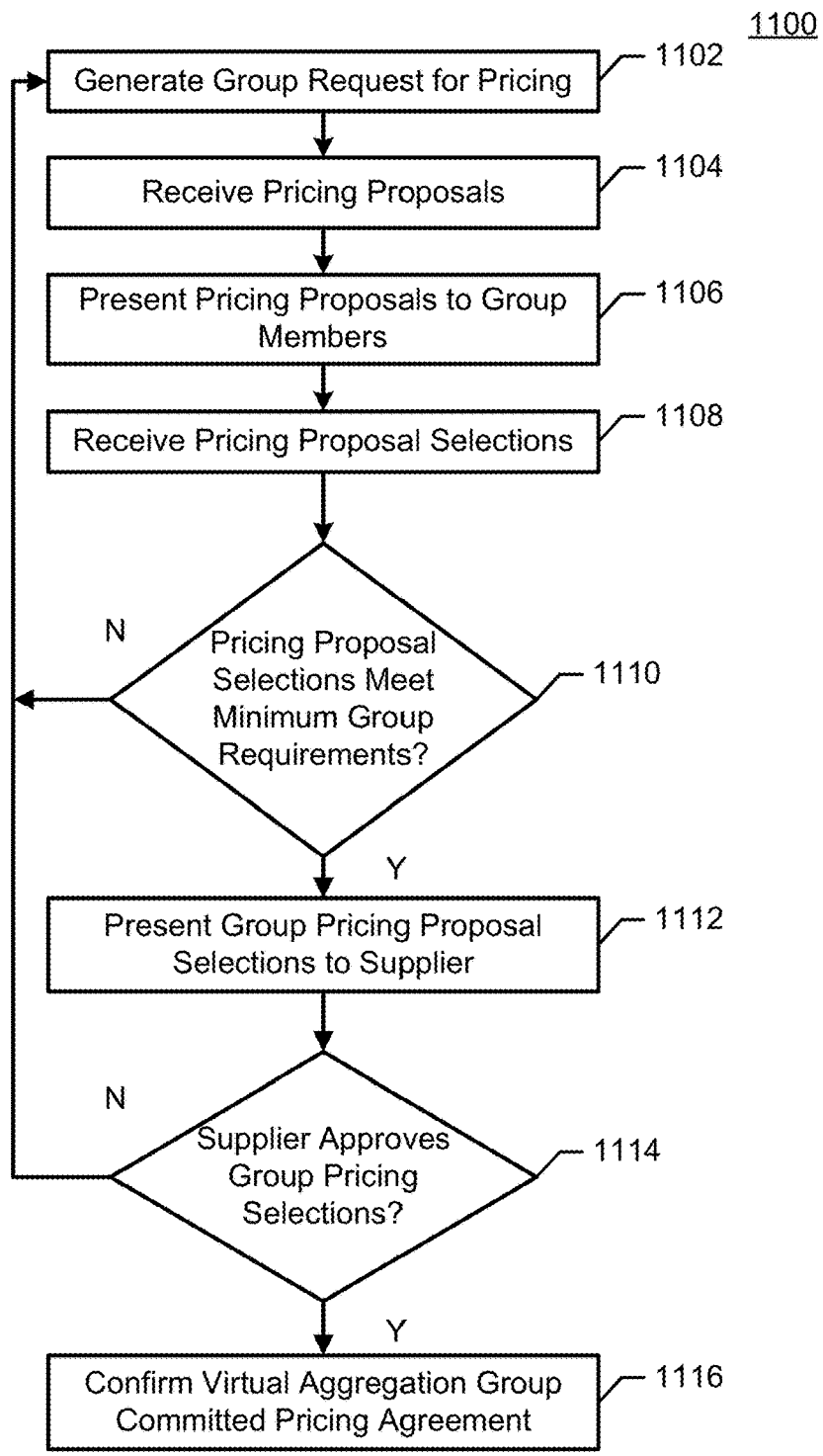
Figure 12:
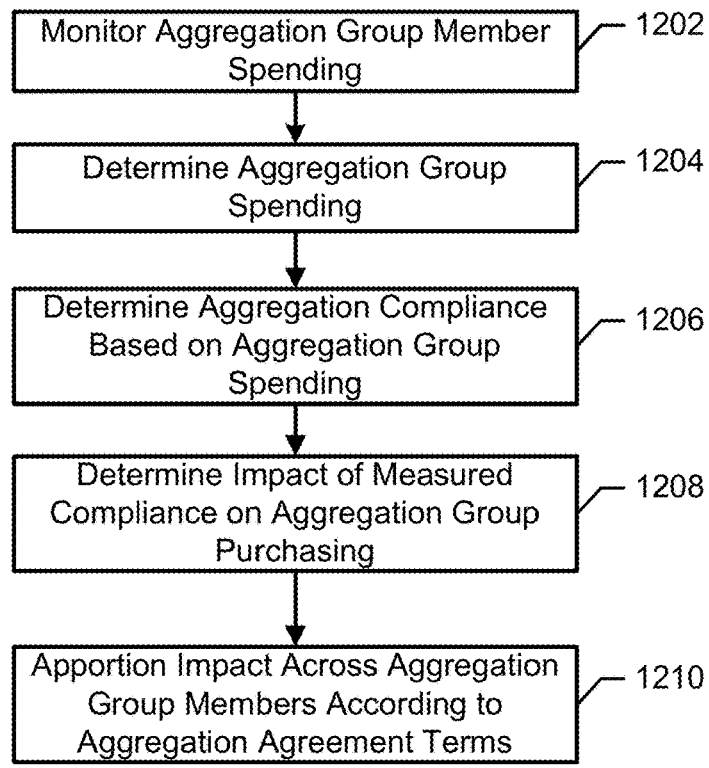
Figure 13:
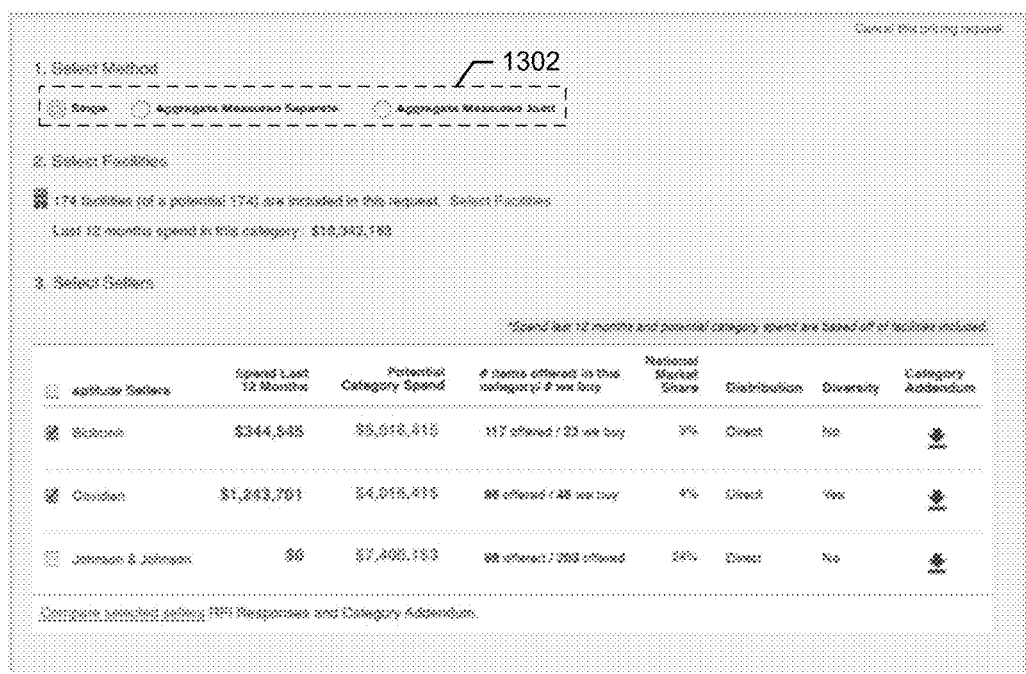
Figure 14:
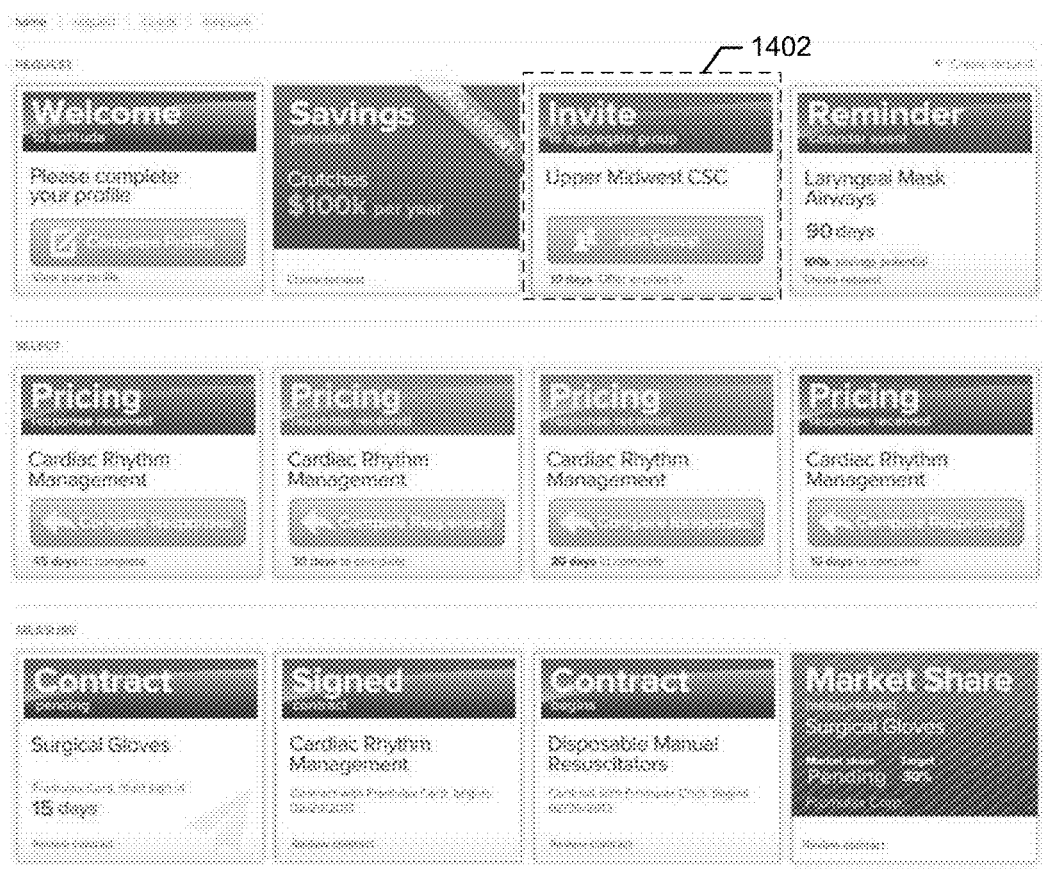
Figure 15:
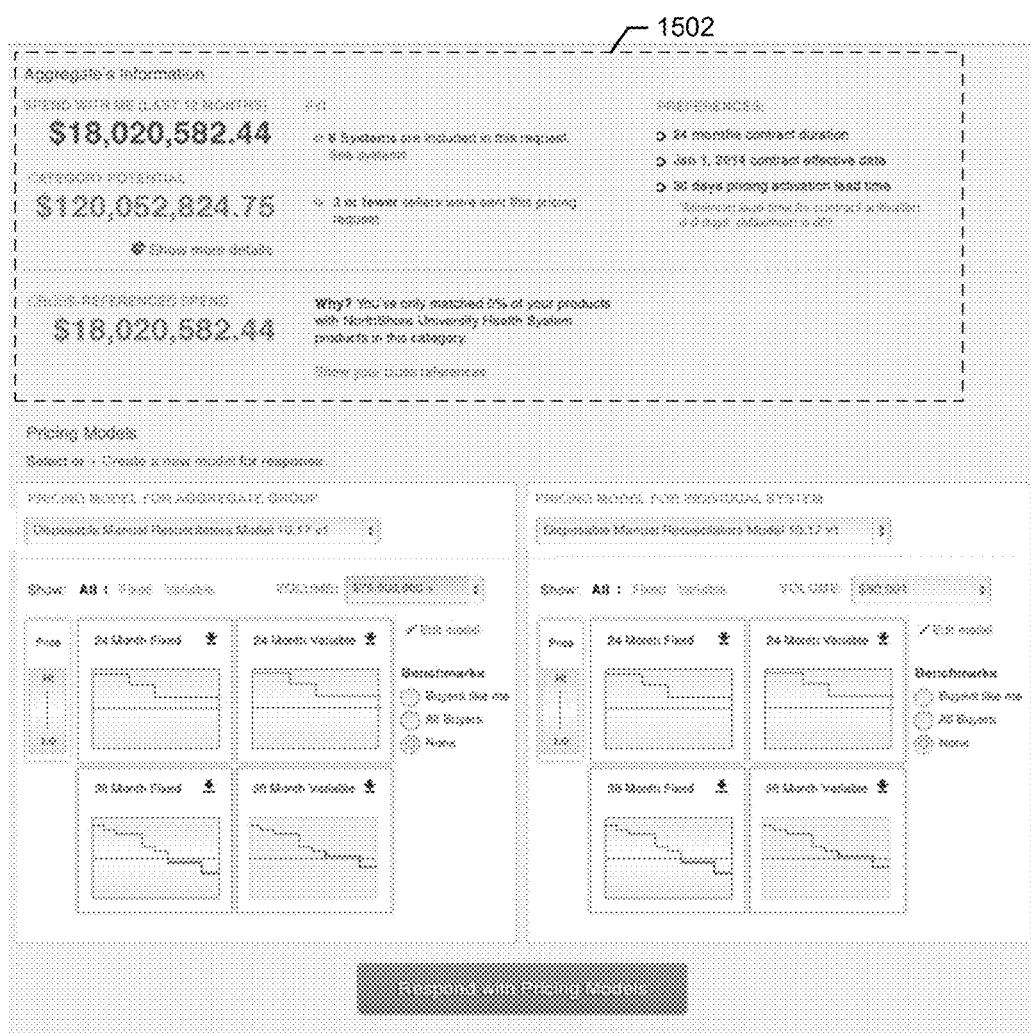
Figure 16:
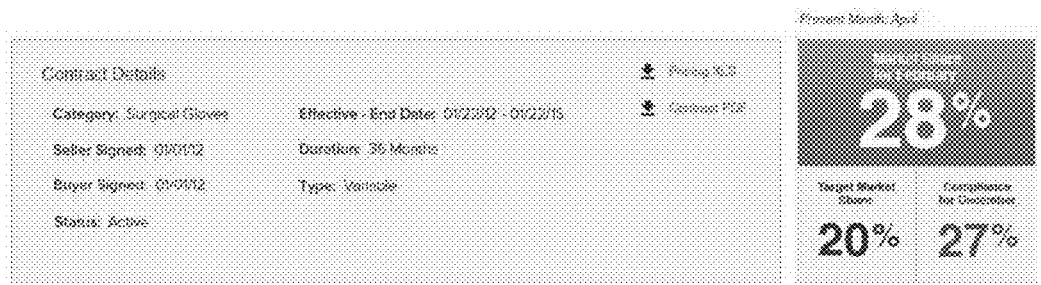

Having thus described certain embodiments of the invention in general terms, reference will now be made to the accompanying drawings, which are not necessarily drawn to scale, and wherein:

FIG. 1 depicts a block diagram of an apparatus in accordance with some example embodiments;

FIG. 2 depicts a block diagram of a market platform in accordance with some example embodiments;

FIG. 3 depicts a block diagram of an example interaction between buyers, suppliers, and a buyer virtual aggregation group using a market platform in accordance with some example embodiments;

FIG. 4 depicts a flow diagram of an example method for implementing a market platform in accordance with some example embodiments;

FIG. 5 depicts a block diagram of an example committed pricing agreement in accordance with some example embodiments;

FIG. 6 depicts a flow diagram illustrating an example method for providing contract compliance monitoring in accordance with some example embodiments;

FIG. 7 depicts a flow diagram illustrating a process for providing inputs to a rating engine to derive rating data in accordance with some example embodiments;

FIG. 8 depicts a flow diagram illustrating an example method for implementing a virtual aggregation group in accordance with some example embodiments;

FIG. 9 depicts a flow diagram illustrating an example method for forming a virtual aggregation group in accordance with some example embodiments;

FIG. 10 depicts a flow diagram illustrating an example method for allowing a buyer to transparently join a virtual aggregation group in accordance with some example embodiments;

FIG. 11 depicts a flow diagram illustrating an example method for entering into a committed pricing agreement by a virtual aggregation group in accordance with some example embodiments;

FIG. 12 depicts a flow diagram illustrating an example method for monitoring and enforcing compliance in a virtual aggregation group in accordance with some example embodiments;

FIG. 13 depicts an illustration of an interface for allowing a buyer to join a virtual aggregation group in accordance with some example embodiments;

FIG. 14 depicts an illustration of an interface for receiving an invitation to join a virtual aggregation group in accordance with some example embodiments;

FIG. 15 depicts an illustration of an interface for responding to an RFP generated by a virtual aggregation group in accordance with some example embodiments; and FIG. 16 depicts an illustration of an interface for viewing virtual aggregation group compliance in accordance with some example embodiments.

DETAILED DESCRIPTION

Aspects of the disclosure include an integrated market platform. The market platform may provide buyers and suppliers with information about a particular market (e.g., healthcare, pharmaceuticals, construction, office supplies, etc.), allowing the buyers and suppliers to enter informed decisions regarding purchase and supply contracts. The market platform may further provide capabilities for optimization, selection, and management of these contracts. Contracts entered between buyers and suppliers may be monitored by the market platform to measure, report, and/or enforce compliance with the terms of the contracts. Example embodiments of a market platform are described further in U.S. patent application Ser. No. 13/765,271, filed Feb. 13, 2013, which is herein incorporated by reference in its entirety.

The market platform may further provide buyers with the capability to contract with one another to establish "virtual aggregation groups." The market platform may function to aggregate individual purchasing agreements from multiple buyers to allow suppliers to contract at a particular volume (e.g., a larger volume than any individual buyer), to allow buyers to obtain volume discounts from a supplier, and to allow buyers the flexibility to join, leave, and participate in many such virtual aggregation groups in a straightforward and transparent manner. For example, buyer participation in such an aggregation group may be as simple as selecting an option "opting in" to being placed into a virtual aggregation group to obtain favorable pricing. The market platform may automatically match buyers into virtual aggregation groups in response to those buyers opting in to the virtual aggregation group process, allowing buyers to obtain more favorable pricing without the burden of negotiating the group relationship with one another.

In some embodiments, the market platform may facilitate the creation of virtual aggregation groups by suggesting the formation of virtual aggregation groups to buyers based on various buyer or group criteria. The market platform may assist virtual aggregation groups with generation of group requests for pricing (RFPs) generated on behalf of the virtual aggregation group, evaluation of responses to the group RFP, and entry into a committed pricing agreement by one or more members of the group based on responses to the group RFP selected by members of the group. The market platform also may monitor compliance with committed pricing agreements entered into by the members of the virtual aggregation group at both the group level and the individual buyer level. The market platform may further enforce compliance for the group and the individual member based on the monitored compliance. Embodiments may thus advantageously allow for the formation of, participation in, and enforcement of virtual aggregation groups with minimal to no direct interaction between members of the virtual aggregation group.

Example embodiments may include methods, systems, apparatuses, and computer program products for leveraging access to buyer spend data to implement a system that allows buyers and virtual aggregation groups to select a purchase plan that most meets their needs, while also ensuring compliance with contract terms. In some embodiments, the market platform may optimize purchase planning operations for virtual aggregation groups by suggesting standard or uniform contract durations, commitment levels, or the like. Such a system benefits both buyers and suppliers, as buyers and virtual aggregation groups are offered multiple options to optimize their spending patterns, while suppliers are ensured contract compliance, allowing them to offer optimal pricing to buyers. Optimization may be based around maximizing value for the buyers and/or suppliers. The term "value" in this context should be understood to mean financial, quality, efficacy, or other qualities or characteristics which the parties may find desirable. For example, the value may relate to minimizing a total dollar cost of all purchasing, maximizing efficacy or quality of purchased products, or minimizing a transition cost resulting from a change in suppliers.

The market platform may provide for efficient pricing and management of responses to requests for pricing prepared by buyers and virtual aggregation groups. In this regard, the market platform may provide interfaces for establishing product prices based on various factors, such as product category, market share commitment of the buyer or virtual aggregation group, contract type and duration, and the like. An interface may be provided that allows for efficient management of these different parameters to provide buyers and virtual aggregation groups with a variety of options to allow for efficient allocation of purchase agreements. These parameters may include both fixed parameters (e.g., contract duration) and variable parameters (e.g., buyer spend in a particular category). The market platform may include monitoring and adjustment based on both types of parameters, including applying dynamic adjustments based on variable parameters as these parameters change.

Suppliers may utilize the market platform to generate price responses for products. These price responses may be generated based on product price levels and discount terms established for different contract parameters by the supplier. For the purposes of this application, the term "contract parameters" refers to features of the contract that the supplier may wish to associate with discounts to incentivize the buyer or group of buyers to comply with particular parameters or engage in a particular contracted behavior. For example, the supplier may offer discounts based on contract parameters such as contract duration, market share commitment, buyer spend volume, group spend volume, or the like.

The market platform may further provide an interface for management of compliance with commitments between the buyer or group of buyers and suppliers or groups of suppliers. The ability to monitor buyer and group spend data allows the market platform to determine the market share the buyer and/or group is providing to the supplier for the particular product or product category that is the subject of a supply contract between the buyer and supplier. The market platform may report market share compliance at both the individual and group level to both the buyer(s) and supplier(s). It should be readily appreciated that although a buyer is a member of a particular virtual aggregation group, the buyer may still maintain separate contracts and/or committed pricing agreements with suppliers. The market platform may enable a buyer to commit a certain amount of their spending in a category to a virtual aggregation group, and reserve an additional amount of their spending in the category for individual contracts. For example, a buyer might designate 60% of their spending in a particular category to a virtual aggregation group, and the remaining 40% of their spending to an individual contract with one or more suppliers. The market platform may also enforce contract provisions according to the market share commitment met by the buyer and/or group of buyers. The market platform may also allow for the buyer, group of buyers, and supplier to agree to particular enforcement provisions, rewards, and penalties for individual contracts. Compliance may be enforced at both the group level and/or the individual member level. For example, compliance provisions may be enforced on a virtual aggregation group such that the impact of under-compliance is enforced in proportion with the compliance level of each member. In other embodiments, buyer compliance may be enforced at the individual buyer level, without the ability of some buyers to impact the pricing offered to other buyers. Example embodiments for monitoring and enforcing contract provisions using the market platform are described further in U.S. patent application Ser. No. 13/765,443 filed on Feb. 12, 2013, which is herein incorporated by reference in its entirety.

The market platform may also function to establish ratings for participants such as buyers, suppliers, and distributors. For the purposes of this application, the term "participants" should be understood to include any party who may engage in contracting, purchasing, distribution, marketing, or compliance monitoring using the market platform. For example, the term "participant" may be used to describe buyers, suppliers, distributors, manufacturers, or marketers that engage with the market platform. The term participant should also be understood to include groups of individual buyers, suppliers, distributors, manufacturers, and the like. For example, a virtual aggregation group containing multiple buyers could be considered as a single participant, multiple participants, or both depending upon the context in which the term is used. The ratings may be based on the participant's interactions with the market platform, such as the behavior of the participants during the RFP, contracting, and purchasing processes. These ratings may be disclosed to other participants to assist with risk management, resource allocation, and decision-making using the market platform. These ratings may be provided as a score according to a defined scoring algorithm (e.g., a single scoring algorithm for each buyer, supplier, or distributor), or by a configurable scoring process unique for a particular party (e.g., a set of weighted parameters defined by the particular party). The ratings may be employed by the participants to assist with evaluation of contracting decisions. In some implementations, the market platform may calculate and display ratings at particular decision points (e.g., when selecting suppliers for generation of an RFP, when determining a price model for preparing a response to an RFP, when entering into a committed pricing agreement, or when evaluating compliance with a committed pricing agreement) to assist and inform participants throughout the process. In some embodiments, the market platform may calculate ratings and use the calculated ratings to automatically make decisions or otherwise alter or generate input throughout the process of virtual aggregation group construction, contracting and compliance monitoring. For example, the participants may establish certain default behavior based on the rating associated with counter-parties, such as selecting a default price model based on a buyer rating, or displaying particular suppliers based on supplier ratings. Example embodiments for deriving and using ratings are described further with respect to U.S. patent application Ser. No. 13/867,035 filed Apr. 20, 2013, which is herein incorporated by reference in its entirety.

In some embodiments, participant ratings may be used to establish risk levels and pricing for various derivative products. For example, participants may hedge risk or insure against non-compliance by creation of derivative products related to risks associated with meeting market share commitment levels. Derivative instruments may be used to allow suppliers to hedge against the risk of non-compliance by their buyers, such as by selling an instrument including multiple tranches of buyers of different risks, where payment on the instrument with the rate at which buyers associated with the instrument fail to meet market share commitments. For example, ratings may be used to automate "bundling" of contracts for financing opportunities based on virtual aggregation groups. The market platform may collect a set of sellers that have active contracts, such as a group of sellers within a virtual aggregation group. The market platform may use the ratings of the buyers associated with the CPAs to select "quality" low-risk contracts (e.g., contracts associated with highly rated buyers). These contracts may be bundled together and used to offer sellers financing on the contracts, such as one time, discounted payouts to purchase the low-risk contracts.

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, and/or the like.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, an applications processor integrated circuit for an integrated circuit in a server, a network device, and/or other computing device.

As defined herein, a "computer-readable storage medium," which refers to a non-transitory physical storage medium (e.g., volatile or non-volatile memory device), can be differentiated from a "computer-readable transmission medium," which refers to a transitory electromagnetic signal.

FIG. 1 illustrates a block diagram of an apparatus 102 in accordance with some example embodiments. The apparatus 102 may include a computing device that enables a market platform as described above. For example, the apparatus 102 may be implemented on one or more servers or other computing devices that may be configured to implement and control applications in accordance with various example embodiments. These applications may include hardware and software modules configured to receive market information, and to provide services related to the market platform as described above. As another example, the apparatus 102 may be implemented on one or more servers to provide a back-end interface and/or web interface in accordance with various example embodiments. Examples of computing devices that may correspond to the apparatus 102 are described further below with respect to FIG. 2. Accordingly, it will be appreciated that the apparatus 102 may comprise an apparatus configured to implement and/or otherwise support implementation of various example embodiments described herein.

It should be noted that the components, devices or elements illustrated in and described with respect to FIG. 1 below may not be mandatory and thus some may be omitted in certain embodiments. Additionally, some embodiments may include further or different components, devices or elements beyond those illustrated in and described with respect to FIG. 1.

The apparatus 102 may include or otherwise be in communication with processing circuitry 110 that is configurable to perform actions in accordance with one or more example embodiments disclosed herein. In this regard, the processing circuitry 110 may be configured to perform and/or control performance of one or more functionalities of the apparatus 102 (e.g., functionalities of a computing device on which the apparatus 102 may be implemented) in accordance with various example embodiments, and thus may provide means for performing functionalities of the apparatus 102 (e.g., functionalities of a computing device on which the apparatus 102 may be implemented) in accordance with various example embodiments. The processing circuitry 110 may be configured to perform data processing, application execution and/or other processing and management services according to one or more example embodiments. In some embodiments, the apparatus 102 or a portion(s) or component(s) thereof, such as the processing circuitry 110, may be embodied as or comprise a chip or chip set. In other words, the apparatus 102 or the processing circuitry 110 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 102 or the processing circuitry 110 may therefore, in some cases, be configured to implement an embodiment of the invention on a single chip or as a single "system on a chip." As such, in some cases, a chip or chipset may constitute means for performing one or more operations for providing the functionalities described herein.

In some example embodiments, the processing circuitry 110 may include a processor 112 and, in some embodiments, such as that illustrated in FIG. 1, may further include memory 114. The processing circuitry 110 may be in communication with or otherwise control a user interface 116 and/or a communication interface 118. As such, the processing circuitry 110 may be embodied as a circuit chip (e.g., an integrated circuit chip) configured (e.g., with hardware, software or a combination of hardware and software) to perform operations described herein.

The processor 112 may be embodied in a number of different ways. For example, the processor 112 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. Although illustrated as a single processor, it will be appreciated that the processor 112 may comprise a plurality of processors. The plurality of processors may be in operative communication with each other and may be collectively configured to perform one or more functionalities of the apparatus 102 as described herein. The plurality of processors may be embodied on a single computing device or distributed across a plurality of computing devices collectively configured to function as the apparatus 102. In some example embodiments, the processor 112 may be configured to execute instructions stored in the memory 114 or otherwise accessible to the processor 112. As such, whether configured by hardware or by a combination of hardware and software, the processor 112 may represent an entity (e.g., physically embodied in circuitry—in the form of processing circuitry 110) capable of performing operations according to embodiments of the present invention while configured accordingly. Thus, for example, when the processor 112 is embodied as an ASIC, FPGA, or the like, the processor 112 may be specifically configured hardware for conducting the operations described herein. Alternatively, as another example, when the processor 112 is embodied as an executor of software instructions, the instructions may specifically configure the processor 112 to perform one or more operations described herein.

In some example embodiments, the memory 114 may include one or more non-transitory memory devices such as, for example, volatile and/or non-volatile memory that may be either fixed or removable. In this regard, the memory 114 may comprise a non-transitory computer-readable storage medium. It will be appreciated that while the memory 114 is illustrated as a single memory, the memory 114 may comprise a plurality of memories. The plurality of memories may be embodied on a single computing device or may be distributed across a plurality of computing devices collectively configured to function as the apparatus 102. The memory 114 may be configured to store information, data, applications, instructions and/or the like for enabling the apparatus 102 to carry out various functions in accordance with one or more example embodiments. For example, the memory 114 may be configured to buffer input data for processing by the processor 112. Additionally or alternatively, the memory 114 may be configured to store instructions for execution by the processor 112. As yet another alternative, the memory 114 may include one or more databases that may store a variety of files, contents or data sets. Among the contents of the memory 114, applications may be stored for execution by the processor 112 to carry out the functionality associated with each respective application. In some cases, the memory 114 may be in communication with one or more of the processor 112, user interface 116, and communication interface 118 via a bus(es) for passing information among components of the apparatus 102.

The user interface 116 may be in communication with the processing circuitry 110 to receive an indication of a user input at the user interface 116 and/or to provide an audible, visual, mechanical or other output to the user. As such, the user interface 116 may include, for example, a keyboard, a mouse, a joystick, a display, a touch screen display, a microphone, a speaker, a Light Emitting Diode (LED), a lighting device, and/or other input/output mechanisms. In embodiments in which the apparatus 102 is implemented on a server, aspects of the user interface 116 may be limited, or the user interface 116 may even be eliminated.

The communication interface 118 may include one or more interface mechanisms for enabling communication with other devices and/or networks. In some cases, the communication interface 118 may be any means such as a device or circuitry embodied in either hardware, or a combination of hardware and software that is configured to receive and/or transmit data from/to a network and/or any other device or module in communication with the processing circuitry 110. By way of example, the communication interface 118 may be configured to enable the apparatus 102 to communicate with another computing device via a wireless network, such as a wireless local area network (WLAN), cellular network, and/or the like. Additionally or alternatively, the communication interface 118 may be configured to enable the apparatus 102 to communicate with another computing device via a wireline network. In some example embodiments, the communication interface 118 may be configured to enable communication between the apparatus 102 and one or more further computing devices via the Internet. Accordingly, the communication interface 118 may, for example, include an antenna (or multiple antennas) and supporting hardware and/or software for enabling communications with a wireless communication network (e.g., a wireless local area network, cellular network, and/or the like) and/or a communication modem or other hardware/software for supporting communication via cable, digital subscriber line (DSL), universal serial bus (USB), Ethernet or other methods.

Having now described an apparatus configured to implement and/or support implementation of various example embodiments, features of several example embodiments will now be described. It will be appreciated that the following features are non-limiting examples of features provided by some example embodiments. Further, it will be appreciated that embodiments are contemplated within the scope of disclosure that implement various subsets or combinations of the features further described herein. Accordingly, it will be appreciated that some example embodiments may omit one or more of the following features and/or implement variations of one or more of the following features.

FIG. 2 depicts a block diagram of a system 200 for managing virtual aggregation groups in accordance with some example embodiments. The system 200 may include several computing nodes or devices in communication with one another. Each of the devices may have the same or similar configuration to the apparatus 102 described with respect to FIG. 1. The system 200 may include a market platform server 202 in communication with one or more of a buyer interface 210, a supplier interface 212, a market interface 214, a distributor interface 216 and/or other devices (not pictured). The market platform server 202 may send and receive data to and from these devices 210-216 to facilitate management of virtual aggregation groups.

The market platform server 202 may access one or more datastores. These datastores may include a product datastore 204, a contract datastore 206, a buyer spend datastore 208, and a ratings datastore 218. By accessing these datastores 204, 206, 208, and 218, the market platform server 202 may provide information to buyers and suppliers, manage contracts, monitor compliance with said contracts, and establish ratings for market platform participants.

The product datastore 204 may include information describing products available from one or more suppliers. For example, in the medical field, HCOs may purchase tens of thousands of distinct medical and surgical supply products. These products may be purchased from hundreds or thousands of different suppliers. Such products may be organized into various categories relating to the type of product, the intended use of the product, or the like. For example, in the case of medical supplies and devices, products may be identified as belonging to a particular United Nations Standard Products and Services Code (UNSPSC). A category may be a pre-defined collection of one or more, and typically a plurality of, UNSPSCs. Categories may be pre-defined for a particular market ecosystem or may be pre-defined by the market. For example, products may be assigned to particular categories by the functionality of the product (e.g., products that protect the user from a particular hazard), by the construction of the product (e.g., products made of latex), by the intended use of the product (e.g., products used by surgeons during a heart surgery), general industrial knowledge, or by any other set of criteria. These categories may be established by an owner or maintainer of the market platform, or in communication with suppliers and/or buyers of the products. Product associations with particular categories may be mutually exclusive, such that any given product may only be associated with a single category. These categories may be further utilized to assist with a collection of buyer spend data, such that market share compliance may be based upon buyer spend in particular categories. Categories may include a plurality of related products and, in some embodiments, products may be associated with a single UNSPSC to assist with market share compliance measurements.

The contract datastore 206 may include information pertaining to one or more contracts entered into by one or more buyers or virtual aggregation groups with one or more of the suppliers. These contracts may include products to be purchased, contract durations, item prices, and various compliance terms. The compliance terms may include various parameters, such as market share levels and associated prices. For example, a buyer may be entitled to purchase an item at a discounted price if they offer the supplier at least 80% market share of their spending in a particular product category (e.g., a particular UNSPSC). If the buyer only provides the supplier with 75% market share (e.g., the buyer purchases 200 items in the particular UNSPSC for a given compliance period, but only purchases 150 items from the particular supplier, or the buyer purchases $10,000 worth of product in a particular UNSPSC but only $7,600 from the particular supplier), the buyer may lose the discounted price, and the supplier may be entitled to recover the difference between the discounted price and the non-discounted price from the buyer, the supplier may be entitled to raise the price for the next compliance period, or other enforcement action may be taken, depending upon the contract parameters. The contract datastore 206 may also include price proposals offered by suppliers, but which are not accepted by the buyer. For example, the contract datastore 206 may store proposals created by the suppliers in response to a RFP generated by the buyer. As an alternative example of an over-compliance scenario, if the buyer were to purchase products equivalent to a 90% spend in a given market share, when the buyer only originally committed to an 80% category spend, the buyer might be presented with an additional discount for a next term, or a rebate equal to the difference between the discount level offered at an 80% market share versus the actual 90% market share.

The market platform server 202 may also be operable to receive spend data from a buyer spend datastore 208. In some embodiments, the buyer spend datastore 208 may be located at an external computing node from the market platform server 202. For example, the buyer spend datastore 208 may be implemented as a purchase order and invoicing or material management system used by the buyer to order products from one or more suppliers. The buyer spend datastore 208 may include an application programming interface (API) used to supply the spend data to the market platform server 202 as orders are placed or invoiced by the buyer. Although the buyer interface 210 and the buyer spend datastore 208 are represented as separate blocks in the illustration, these entities may also be implemented as a single entity, such as a computer node that provides both an interface to the market platform aspects of the market platform server 202 in addition to supplying the market platform server 202 with buyer spend data.

In some embodiments, the buyer spend datastore 208 may be an ERP system or a materials management system, and queries may be used to extract spend data from purchase orders. For example, Structured Query Language (SQL) queries may be performed at particular intervals (e.g., once a day, once a week, once a month), to extract item prices, quantities, model numbers, and the like, and report the extracted data as customer spend data. As alternative or additional examples, buyer spend data 208 may be provided to the market platform server 202 as a file periodically generated and/or extracted by a buyer. For example, a hospital may periodically generate a spend data file from invoice data. Such a file may be provided in a comma delimited format, such as a set of comma separated values (CSV) or a spreadsheet. As another additional or alternative embodiment, spend data may be placed in a particular storage location by the buyer (e.g., at a particular disk or network location), and periodically retrieved by the market platform server 202. The market platform server 202 may perform actions to normalize the data for generating analytics and/or benchmarks for the spend data across multiple buyers and/or suppliers. The market platform server 202 may also use the spend data to determine whether the buyer is meeting market share commitment levels (e.g., by comparing the total number of products purchased in a particular product category vs. the number of products in that category purchased from a particular supplier, or the total amount of spending in the particular category vs. the amount of spending with the particular supplier). Spend data may be tracked over a period of time, and beyond a particular month. For example, in some circumstances, buyer invoices may be reconciled beyond the month in which the purchase is invoiced, so spend data may be captured up to three months after the particular month, and invoices received during this time may be reconciled to the date in which the associated purchase was made.

In some embodiments, the buyer spend data 208 may allow for compliance monitoring at various levels of granularity. For example, a buyer may include multiple facilities or locations (e.g., a hospital system with multiple branches). The buyer spend data may allow for analysis and analytics to determine compliance at an individual facility level by examining only purchase orders and/or invoices from that particular facility. Similarly, on the purchaser side, the spend data may identify which facilities are experiencing backorders from the purchaser, informing the supplier as to which distributors may be experiencing problems. Compliance for virtual aggregation groups may be measured in a similar manner to measurement of buyer spending by aggregating individual group member spend data to determine spending for the group as a whole.

The ratings datastore 218 may store ratings for participants derived from the participant behavior. These ratings may reflect an assessment of factors that may indicate the desirability of engaging with a particular participant via the market platform. In some embodiments, a rating associated with a particular virtual aggregation group may be derived from the ratings of the members of the group. For example, a virtual aggregation group rating may reflect an average of the ratings of the group members, or a weighted average of the group members weighted by the spending volume of each member. Ratings may provide indications of various desirable or undesirable behavioral traits exhibited by participants, including but not limited to a confidence in the validity of product cross-references provided by a particular supplier, a favorability of legal terms for contracts offered by a particular supplier, an assessment of the quality of sales support and assistance provided by a particular supplier, an indication of a favorability of pricing offered by a particular supplier, an indication of a likelihood that a particular buyer or group of buyers will comply with an agreed-upon market-share commitment, an indication of the likelihood that a particular buyer will alter their purchasing behavior in response to an RFP created by the buyer, or the like. In some embodiments, a participant rating may represent a weighted score derived from participant behavior, such as how frequently a buyer meets agreed-upon market share commitment levels, how frequently a supplier suffers backorders, or how frequently a distributor suffers shipment delays. The market platform 202 may observe and monitor participant behavior and utilize a ratings engine (see FIG. 6) to derive the ratings based on the observed behavior.

Buyers, suppliers, and distributors may interact with the system 200 via a buyer interface 210, a supplier interface 212 and a distributor interface 214, respectively. The buyer interface 210 may allow buyers to specify product supply needs to the market platform server 202, to review purchase plans generated by the market platform server 202, and enter into purchase contracts provided by suppliers. Contracts to which the buyer and supplier have agreed may be memorialized by the market platform as committed pricing agreements. These contracts may be generated by applying the terms of a particular pricing proposal to a template based on a set of rules, terms, and categories specified by the market platform. For example, prior to use of the market platform system, the buyer and supplier may each agree to certain base terms by which supply contracts generated by the system will be governed. When the buyer receives a response to a RFP, the price response may include a set of pricing terms. The buyer may make selections from these terms (e.g., market share commitment levels, contract duration, etc.), and apply these selections, along with pricing terms associated with said selections, to a committed pricing agreement template as defined within the previously agreed-to terms and conditions. The template with the terms from the pricing proposal applied may be used to generate a finalized committed pricing agreement containing contract language that includes the selected terms and associated prices. Buyers and suppliers may utilize e-signature technology to execute a committed pricing agreement generated by the system in this manner. The buyer interface 210 may also allow for viewing of analytics, benchmarks and compliance data derived from buyer spend data, so that buyers may monitor the status of their purchases and contracts. The buyer interface 210 may also enable buyers to create one or more RFPs to solicit pricing offers from suppliers.

The buyer interface 210 may further allow buyers to participate in virtual aggregation groups. For example, the buyer interface 210 may provide the buyer with the tools to join or create a virtual aggregation group, engage in contracting decisions as a virtual aggregation group member, and monitor compliance of the virtual aggregation group. Example methods for participation in a virtual aggregation group are described further below with respect to FIGS. 3 and 8-11.

The supplier interface 212 may allow suppliers to provide data to the market platform server 202. Suppliers may provide information about their products, such as product names, product prices and/or pricing models. The suppliers may also use the supplier interface 212 to respond to RFPs initiated by buyers and/or virtual aggregation groups. RFP responses provided by the suppliers may include one or more pricing proposals, including contract parameters that are variable by one or more factors, such as the market-share example described above. The contracts may also include compliance provisions, payment provisions, penalties, and the like.

The buyer interface 210, the supplier interface 212, and the datastores 204-208 may communicate with the market platform server 202 via a network 216. For example, the buyer interface 210 and the supplier interface 212 may be implemented as a web interface, accessible to buyers and suppliers via the Internet. As described above, the market platform server 202 may be configured to interface with a variety of computing devices located at the same or different nodes of the network 216.

The system may also include a market interface 214. The market interface 214 may provide administrative, management, and/or analytic services for interacting with the market platform. For example, the market interface 214 may provide access to analytic data generated by the market platform server 202 using the buyer spend data and contract information. The market interface 214 may provide an external or administrative user with access to various administrative and management functions, including but not limited to maintenance of user accounts and information, extraction of analytic data, generation of reports, or the like. In some embodiments, the market interface 214 may provide the ability to access analytic data to third parties external to the system.

The system 200 may also include a distributor interface 216. The distributor interface 216 may provide distributors with access to the market platform to inform other participants of the terms and conditions the distributor is capable of offering for distribution of products from a supplier to a buyer. For example, the distributor interface 216 may allow a distributor to provide their particular costs for storage and delivery of particular products offered by the supplier, to assist suppliers and buyers with selection of an optimal distributor for a particular product or product category. The market platform 202 may track distributor behavior, such as product shipments and markups similarly to how buyer spend and supplier fulfillment behaviors are tracked, and analytics may be generated based on the distributor behavior.

As described above the market platform server 202 may be operable to receive buyer and virtual aggregation group product requirements in the form of one or more RFPs, to receive supplier price proposals in response to the RFPs, to generate a purchase plan for the buyer based on the supplier responses, to allow the buyer and supplier to enter into one or more contracts, and to determine compliance with the provisions of the entered contracts. Example methods for performing this functionality are described further below with respect to FIGS. 4 and 6. The market platform 202 may be further operable to determine ratings for participants using the market platform to assist and inform other participants during the contracting process. The market platform 202 may also assist buyers with participation in virtual aggregation groups as described above with respect to the buyer interface 210.

To assist the supplier with responding to buyer RFPs, the market platform may offer various tools and techniques for generating product pricing data for consideration by the buyer. These tools may include a multi-dimensional array representation of discount levels for products within a category, with market share commitment levels, sales volume numbers, and/or additional contract parameters along axes of the array. Particular pricing models may be established for each product in a category or the category as a whole, and these pricing models may be provided in a format that allows for saving, loading, and copying of price information to simplify the process of responding to an RFP. Pricing models may also be associated with particular buyers or buyers of a particular size or other buyer characteristics, to prevent the supplier from having to recreate the entire pricing model from scratch for every RFP. Example embodiments of methods and systems for providing a pricing utility are described in U.S. patent application Ser. No. 13/765,479, which is herein incorporated by reference in its entirety.

The market platform may store data relating to purchase plans and pricing responses derived for buyers from one or more contract offerings provided by the suppliers. The market platform may provide a purchase planner for interacting with this data. The purchase planner may enable a buyer to view proposals offered by multiple suppliers and to examine different mix scenarios to identify an optimal set of proposals to meet the buyer's needs from the available proposals. The purchase planner may allow for the buyer to alter market share commitments and contract durations to determine the impact of the alterations on the buyer's overall purchasing. As the buyer changes commitment levels for a first proposal, the purchase planner may ensure that the buyer does not exceed 100% category market share commitment by adjusting other selected proposals as needed. The category market share commitment may be determined based on the supplier's maximum potential market share in the category, rather than the overall market share for the category. For example, a supplier may not offer a particular product or product cross-reference for an item in a category purchased by the buyer. Purchases of this product which the supplier does not offer would not be used to calculate the market share provided by the buyer in such a scenario. As such, buyer market share calculations may not be affected where suppliers provide different levels of coverage in a category. This also means that two or more contracts in a given category may be able to reach market share commitments that exceed 100% in aggregate, as different suppliers may not have overlapping coverage in the same category, such that purchasing a product from a first supplier does not reduce the market share of a second supplier. The purchase planner may also allow the buyer to "lock" certain proposals such that alteration of other proposals does not impact the locked proposals. The purchase planner may also allow the buyer to optimize for different contract mixes and to see the proposals that result in these optimal mixes. For example, the buyer may optimize for a maximum cost savings, minimum product conversion, a minimum number of suppliers, or various other contract mixes. Example embodiments of methods and systems for providing a purchase planner are described in U.S. patent application Ser. No. 13/765,507, which is herein incorporated by reference in its entirety.

The market platform may include various applications, interfaces, and methods for enforcing compliance with the terms of contracts entered into between buyers (or groups of buyers) and suppliers. These contract terms may relate to market share commitment levels, contract durations, other contract terms and conditions, enforcement terms and conditions, and the like. By reviewing and analyzing buyer spend data, the market platform may accurately determine whether both parties are meeting their obligations under the agreed-upon contracts. In the event that one or both parties are not in compliance (or in over compliance), the market platform may dynamically enforce the terms of the contract as specified in the original agreement by adjusting one or more price parameters.

For example, in a scenario where the buyer or group of buyers is not meeting an agreed-upon market share commitment for product purchases within a particular category, the market platform may notify the supplier of the under compliance, and provide the supplier with various options as specified under the original contract. These terms may include adjusting the price of the products for the next compliance period, requesting a payment from the buyer in the amount of the discount level that the buyer failed to meet, or various other contract measurement and/or enforcement methods. By ensuring compliance with the terms of the contract, the market platform advantageously provides suppliers with accurate data about compliance. Because suppliers are provided with accurate compliance data, the suppliers do not need to budget for possible unverifiable under compliance by the buyer or group of buyers, nor do the suppliers need to conduct audits to verify compliance. Conversely, buyers that meet or exceed compliance targets may be rewarded with beneficial adjustment of their price parameters. For example, a buyer or group of buyers may be rewarded for compliance or over-compliance with an increased discount level or with a "true-up" rebate payment reflecting the difference between the price the buyer paid and the discounted price associated with the compliance target the buyer reached. It should be readily appreciated that various additional or alternative price parameter adjustments could be employed, including but not limited to a release of escrow funds to the buyer, receiving a rebate payment, receiving an increased discount for the next compliance period, or the like. As such, suppliers may offer buyers or a group of buyers lower prices or price rebates due to the accurate reporting of data.

FIG. 3 depicts a block diagram of an example interaction between buyers, suppliers, and a buyer virtual aggregation group using a market platform in accordance with some example embodiments. The block diagram depicts several suppliers, supplier A 302, supplier B 304, and supplier C 306 in communication with several buyers, buyer A 308, buyer B 310, buyer C 312, and buyer D 314. In the present example, buyer A 308 is operating independently, while buyer B 310, buyer C 312, and buyer D 314 have joined a virtual aggregation group 316. By establishing the virtual aggregation group 316, buyer B 310, buyer C 312, and buyer D 314 may pool together their spending in order to enhance their bargaining power when entering into pricing agreements with the suppliers. It should be appreciated that the market platform 202 may manage the operations of the virtual aggregation group such that the individual buyers do not interact directly with one another during the contracting process. In fact, if the buyers opt in to the virtual aggregation group process, the market platform may provide a transparent implementation such that buyers are not even aware of whether or which virtual aggregations groups of which they are members, instead, the buyers may continue to operate independently while still receiving the price benefits of being a member of a group. In other embodiments, the market platform 202 may facilitate the creation of formal associations between buyers that involve legal agreements and an awareness of the performance of the other members of the group. The market platform 202 may provide tools to assist the buyers with creating, joining, and managing their membership in the virtual aggregation group 316. As depicted in FIG. 3, it should be appreciated that the market platform may interact with both buyers that are members of virtual aggregation groups and buyers that are not members of a virtual aggregation group. For example, buyer A 308 is not a member of a virtual aggregation group, but buyer A 308 may still utilize the market platform 202 to enter into supply contracts with the suppliers 302-306. In circumstances where buyers have formed a virtual aggregation group, the market platform 202 may provide members of the virtual aggregation group with the ability to generate a joint RFP for the virtual aggregation group as a whole. Although FIG. 3 depicts buyers as either members of a virtual aggregation group or not, it should be readily appreciated that a buyer may be a member of multiple virtual aggregation groups, or a member of a virtual aggregation group for some products/categories of products and acting as an individual for the same or different products or categories. An example method for managing a group RFP for the virtual aggregation group is described further below with respect to FIG. 10.

FIG. 4 depicts a flow diagram of an example method 400 for implementing a market platform in accordance with some example embodiments. The method 400 is an example of a process performed by a market platform, such as the market platform server 202, to assist buyers with requesting and selecting one or more contract proposals provided by one or more suppliers, and to assist suppliers with monitoring and enforcement of contract provisions, such as market share commitments.

At action 402, the method receives a set of buyer needs. As described above, the buyer needs may be derived from a set of spend data provided by the buyer (e.g., 3 months, 6 months, or 12 months of spend data), or the buyer may manually generate a RFP to request pricing for a particular product, product category, or group of products/product categories. These needs may be identified based on purchasing efficiency analytics and benchmarks, examination of a contract bid calendar, identification of expiring contracts, or the like.

At action 404, a RFP may be generated by the method in response to input received form the buyer at action 402. The RFP may be provided to one or more suppliers to allow the suppliers to generate pricing proposals in response to the RFP.

At action 406, the method 400 may receive pricing information, such as contract parameters, in response to the RFP generated at action 404. As described above with respect to FIG. 2, suppliers may present one or more pricing proposals to meet some or all of the needs of the buyer, and the market platform may analyze these pricing proposals to generate a purchase plan for the buyer.

At action 408, the method 400 may present the pricing options (e.g., a series of contracts with buyer's options one or more parameters) received from the suppliers to the buyer. The pricing options may be presented as a series of pricing proposals with different contract parameters and/or discount terms, or, as described above, the user may be presented with a purchase plan that provides a selection of optimal contracts or sets of one or more contracts for the user. Upon acceptance of one of these pricing proposals by a buyer, a contract may be generated from the terms of the pricing proposal.

At action 410, the method 400 may receive a selection of pricing options from the buyer. As described with respect to FIGS. 2 and 3, the market platform may generate a contract or other committed pricing agreement from the selection. This selection may indicate that a contractual relationship has been entered into between the buyer and supplier at the terms specified in the selected contract.

At action 412, the method 400 may monitor buyer spend data to track compliance with the terms of the selected contract. In cases where compliance is based on market share, the method 400 may determine market share levels by comparing the purchases of the product from each supplier with the total purchases of products in that product category from all suppliers. At action 414, the data derived from the spend data (e.g., market share levels) may be compared against the terms of the contract to determine if the buyer is in compliance. In circumstances where the buyer is not in compliance, the market platform may notify the supplier to take appropriate action, or the market platform may automatically enforce the terms of the contract (e.g., by raising the price of the products, or by imposing a penalty on the buyer to be paid to the supplier in the amount of the contract deficiency).

FIG. 5 depicts a block diagram of an example committed pricing agreement 500 in accordance with some example embodiments of the present invention. Once the buyer and supplier agree to contract terms, the agreement may be memorialized as a committed pricing agreement. The committed pricing agreement 500 includes the various terms, conditions, products, and pricing terms related to the agreement entered by the buyer and supplier. The market platform may use such a committed pricing agreement to monitor and inform the buyer and supplier of contract compliance. The committed pricing agreement 500 may include a product list 502, a pricing array 504, management terms 506, and a compliance target 508. In some embodiments, the committed pricing agreement 500 may be associated with a particular buyer facility or set of facilities. In such embodiments, the committed pricing agreement 500 may also include a listing of these associated facilities (not shown), or the facilities may be included in the management terms 506.

The product list 502 may include a list of the products which are the subject of the particular agreement between the buyer and the supplier. For example, the product list 502 may include all products within a particular category that the buyer has the opportunity to purchase from a supplier, or the product list 502 may include a list of all products that the supplier offers in the category.

The product list 502 may be used in conjunction with the pricing array 504 to determine prices for each product based on an achievement level. For example, the pricing array 604 may include a set of discount terms or a set of product prices that correspond to variable parameters associated with the committed pricing agreement. As the variable parameters change due to the achievement of the buyer and the supplier, the system may notify the buyer and supplier of these changes, and initiate contract enforcement as appropriate according to the management terms 506 of the contract.

The management terms 506 may include parameters or contract models that dictate how changes in the contract caused by achievement of the parties should be addressed. For example, the management terms 506 may indicate that, upon underachievement or over achievement (e.g., failing to meet a market share target or reaching a higher market share target), the buyer and supplier should be notified by the underachievement or over achievement, such as by an e-mail, text message, or telephone call initiated by the market platform. In some embodiments, the management terms may cause actions to take place in response to underachievement or over achievement. For example, the buyer and supplier may agree that product prices should be dynamically adjusted based on measured achievement according to the discount terms within the pricing array 504.

The compliance target 508 may be used to track ongoing achievement of the buyer and/or supplier against a target agreed to by the buyer and seller when establishing the committed pricing agreement. For example, the compliance target 508 may track market share, sales volume, invoice status, product delivery status, or any other variable which may affect management of the contract and/or alteration of prices as reflected in the pricing array 604. This compliance target 508 may function as a fixed value against which achievement is measured (e.g., whether a party is complying, under complying, or overcomplying relative to the target). For example, the compliance target may be established based on commitments made by the buyer and supplier during the contract negotiation process. The buyer may indicate to the supplier that they will offer an initial market share commitment level or an initial spend volume. If the buyer exceeds the market share commitment level, they may be provided with an additional discount, a release of funds from escrow, or a rebate payment from the supplier in accordance with the terms of the contract associated with over performing with respect to the compliance target.

Alternatively, if the buyer fails to meet the compliance target, they may be responsible for remuneration to the supplier.

In some embodiments, the committed pricing agreement may dynamically adjust based on past achievement, and the compliance target 508 may function as an ongoing compliance target. As both parties perform the contract, the compliance target may be updated, and the pricing terms of the agreement updated as achievement changes. For example, the compliance target may be updated at periodic intervals, such as at the end of a monitoring period. For example, pricing terms may be updated based on whatever compliance level each party reached during the previous monitoring period, and the compliance level reached may be established as the new compliance target for the next compliance term. In some embodiments, the pricing terms may not be automatically updated, but the parties may instead be notified so that the parties can separately determine how to enforce the terms of the agreement. The compliance target may also be updated for the supplier. For example, the system may ensure that buyers are paying the correct, negotiated price for products under the terms of the agreement by monitoring buyer spend and invoice data and comparing said data to the terms of the committed pricing agreement. As such, embodiments of the invention may provide for both static (e.g., initial, unchanging compliance targets) and dynamic (e.g., updated pricing every compliance period) uses of the compliance target 508.

FIG. 6 depicts a flow diagram illustrating an example method 600 for providing contract compliance monitoring in accordance with some example embodiments of the present invention. The method 600 enables a buyer and a supplier to monitor the achievement of both parties based on the spend history of the buyer and according to a previously negotiated committed pricing agreement. The buyer and supplier may thus adjust price levels for underachievement or over achievement by one or both parties to conform to agreed pricing terms. The method 600 may allow for adjustment of price levels or various terms to be enforced automatically by a computer system, such as a market platform server, or the method 600 may function to inform the buyer and supplier of compliance and allow the parties to determine how to proceed. For example, if a buyer agrees to a first price at a first market share commitment level, and the buyer exceeds that first market share commitment level to reach a second, higher market share commitment level, the method 600 may adjust pricing of products sold under the agreement to a discount level associated with the second market share commitment level. The method 600 may be performed by a market platform, such as the market platform 202 described with respect to FIG. 2, and the committed pricing agreement may be a committed pricing agreement 500 as described with respect to FIG. 14.

At action 602, the method 600 receives buyer spend data from a buyer spend data source 501. As described above, the buyer spend data 501 may be received by analysis of buyer invoice and/or purchase order data, recall alerts from a supplier, from a buyer ERP or materials management system, by extracting data from one or more files provided by the buyer, or the like (see FIG. 2). At action 604, achievement, such as a market share commitment level reached by the buyer, is determined from the buyer spend data. For example, the buyer spend data may be analyzed to determine the total buyer spend for items in a product category available from the supplier, compared to the total amount the buyer could have spent in the category if the buyer did not buy products from other suppliers. As another example, the buyer spend data may be analyzed to determine the total volume of product sales the buyer purchased from the supplier within the category.

At action 606, a determination is made as to whether there has been a change in achievement status based on the analysis of the spend data at action 604. As described above, a committed pricing agreement 500 may store a compliance target 508 for the agreement. This compliance target may reflect the previous achievement levels of the parties (e.g., the sales volume for the previous review period), or an initial commitment level (e.g., a commitment level negotiated upon execution of the agreement). Action 606 may include verifying whether this status has changed. For example, the method 600 may determine whether the current achievement levels indicate a change in market share, sales volume, or supplier deliveries that would cause a change in the status of the agreement. For example, if the buyer has met but not exceeded a market share commitment level, then no action may be taken by the buyer or supplier. However, if the buyer has exceeded the market share commitment level, then it may be appropriate to offer a benefit to the buyer (e.g., a larger discount), or if the buyer has not met a target market share, then the buyer may receive a penalty (e.g., payment to the supplier of the difference between the discount for the actual market share reached and the discount for the original commitment level). If the achievement is consistent with the previous compliance target, then the method proceeds to action 607 to manage the contract according to the terms of the contract consistent with ongoing compliance with the contract. Otherwise, the method proceeds to action 608 to provide enforcement consistent with the terms of the contract where performance has changed.

At action 607, if the terms of the contract specify some action to take place in response to no change in the performance status (e.g., a buyer meets but does not exceed an agreed upon performance level), certain actions may be taken. For example, the buyer may receive a benefit for meeting their current performance commitment, such as a rebate offered in a rebate contract model. If the buyer is a member of a virtual aggregation group, the terms may be managed according to the pricing terms for the virtual aggregation group. The method may return to action 602 to continue monitoring of performance after managing the contract.

At action 608, the contract is managed according to the terms of the agreement in view of the change in performance status detected at action 606. These terms may be defined within the committed pricing agreement 500. For example, the management terms 506 (see FIG. 5), may describe measures to be taken in response to a change in achievement status. These management terms may, for example, ensure that the market platform informs both the buyer and the supplier of the compliance target of the agreement in the event of under achievement or over achievement. For example, the market platform may send an e-mail to the buyer and supplier with the compliance target of each party. The buyer and supplier may thus optionally take appropriate action. For example, a supplier may elect not to enforce a price increase for a good customer that regularly meets market share commitment levels, but has a single lapse. In the event the buyer is a member of a virtual aggregation group, management of the contract may take into account the compliance status of the other members of the virtual aggregation group or the virtual aggregation group as a whole. Additionally or alternatively, the market platform may automatically enforce price changes based on participant compliance, or certain actions may be taken depending upon participant ratings. For example, a participant with a high rating based on a past history of compliance may be accorded one or more "strikes" or compliance failures before receiving a price adjustment, while a participant with a poor rating may have a price adjustment enforced immediately.

Alternatively, the method 600 may provide for automatic enforcement of contract provisions. For example, contracts may include a set of variable terms that adjust based on buyer and supplier achievement. As these variables change, so too do elements of the contract. One example is where prices are provided according to a pricing array, where axes of the array are related to different variables such as sales volume or market share. As these variables adjust, the buyer is offered discount levels consistent with the variable values. In embodiments where the market platform is configured to automatically enforce the terms of the contract, these prices may dynamically update as the achievement of the parties changes. For example, different contract models may have different enforcement provisions, such that a variable price contract may update a price for the next contract period in response to under or over achievement, while an escrow contract may refund a difference between a standard price and a discount price when the buyer is compliant with the terms of the contract. As such, while action 608 is described as occurring in response to a determination that achievement is not consistent with the commitment levels, contract enforcement could alternatively take place in response to achievement that meets or is otherwise consistent with predetermined commitment levels.

Actions 610, and 612, describe example actions that may be taken to manage the contract. For example, at action 610, pricing terms may be adjusted for the contract according to the established achievement levels and a pricing array 604 associated with the committed pricing agreement. At action 612, the buyer and supplier may be notified of the contract status so that they may take appropriate action. After taking appropriate action to manage the contract in view of the achievement, the method 600 may return to action 602 to continue receiving buyer spend data to manage the contract.

FIG. 7 depicts a flow diagram illustrating a process 700 for providing inputs to a rating engine to derive rating data in accordance with some example embodiments. As participants interact with the market platform to perform transactions, the market platform may observe participant behaviors such as participant spending (e.g., purchase orders and invoices), RFPs, pricing responses, generated analytics and benchmarks, purchase plans, contract details, compliance data, distributor data, and payment data. Ratings for the participants may be dynamically adjusted as transactions are observed by the market platform. The process 700 depicts some example data sources that may be employed by a rating engine 702 (e.g., a software and/or hardware component of a market platform, such as the market platform server 202 described with respect to FIG. 2) to derive a set of rating data 720.

The rating engine 702 may be configured to receive transaction data and to process the transaction data to assign ratings to participants. The transaction data may be gathered by passive monitoring of transactions performed by participants using the market platform. The rating engine 702 may thus have access to various types of transaction data, including but not limited to buyer RFP data 704, buyer purchase plan data 706, committed pricing agreement data 708, buyer spend data 712, compliance data 714, supplier shipment data 716, and distributor fulfillment data 718. These sets of data may be analyzed and processed to obtain a rating for participants using the market platform.

The buyer RFP data 704 may include information relating to the buyer's RFP practices. Different buyers may have varying RFP practices. For example, some buyers may frequently initiate new RFPs for particular products or product categories, but rarely execute contracts in association with an RFP. RFPs generated by buyers that frequently "test the waters" but fail to follow through may be less desirable to suppliers, as these buyers appear less likely to enter into a new pricing agreement with a supplier based on a particular RFP response. To detect these buyers, the rating engine may track how often a particular buyer initiates an RFP, and compare this frequency with how often the buyer engages in a committed pricing agreement arising out of an RFP. Buyers that regularly "follow through" on their RFPs may have a correspondingly higher buyer rating than buyers that fail to respond to supplier responses to their RFPs. For example, the rating engine 702 may determine a buyer RFP rating by dividing the number of RFPs initiated by the buyer that result in a committed pricing agreement by the total number of RFPs initiated by the buyer to determine an RFP success percentage value. This buyer RFP rating may be provided to other participants directly, or it may be used in conjunction with various other weighted metrics and analytics to derive an overall "score" for a participant.

The buyer purchase plan data 706 may include information relating to buyer purchase plans generated using the market platform. As described above, buyer purchase plans may provide a guide for how the buyer intends to allocate spending across various products, such as products in a category. This purchase plan data may be monitored by the rating engine 702 in conjunction with the buyer's spending data 712 to determine how well the buyer is sticking to their intended purchase plan. Buyers that show discipline in planning their purchases and sticking to their plans may be associated with a higher buyer rating than buyers that fail to adhere to their purchase plans. For example, the rating engine 702 may determine a buyer purchase plan deviation rating by identifying a percentage deviation in buyer spending between the buyer actual spending and the buyer's planned spending in a particular category. This buyer purchase plan deviation rating may be provided to other participants directly, or it may be used in conjunction with various other weighted metrics and analytics to determine an overall "score" for a participant.

The committed pricing agreement data 708 may provide the rating engine with information about the committed pricing agreements into which participants have entered. This committed pricing agreement data 708 may be used to verify the frequency with which buyers follow through on RFPs (see buyer RFP data 704, above), and the frequency with which particular buyers and suppliers are able to come to an agreement. Participants that follow through on RFPs and establish committed pricing agreements may be associated with higher ratings than participants that fail to come to agreement. Participants may be associated with a committed pricing agreement data 708 based on a number of committed pricing agreements entered by the participant. For example, a CPA rating may be derived based on the absolute number of CPAs into which the participant has entered, where a larger number of CPAs mean a higher rating. In some other embodiments, the CPA rating may be derived using the spend/sales volume of the participant or the number of categories in which the participant participates, where the number of CPAs is weighted such that smaller or lower volume participants may receive a higher CPA rating for the same number of CPAs than larger or higher volume participants.

The buyer spend data 712 may be used by the rating engine to monitor the purchase habits of buyers and to determine the spending volume of the buyer, along with how well the buyer adheres to their purchase plan(s) and/or how well the buyer meets previously agreed market share commitments (e.g., based on compliance data derived from the buyer spend data 712). Participants that have a large volume of spending or sales, or buyers that adhere to their purchase plans may be associated with a higher rating. Similarly to a CPA rating, participant ratings may be associated with spend data in absolute terms (e.g., higher spend/sales results in a higher rating), or weighted based on the characteristics of the participant.

The compliance data 714 may indicate how well participants have complied with the terms of previous committed pricing agreements. For example, the compliance data may indicate whether a buyer met particular market share commitment levels, or whether a supplier provided products in a timely manner without backorders, delays, or recalls. In some embodiments, the compliance data may take into account buyer performance both as individuals and within virtual aggregation groups. In some embodiments, buyers may be provided with separate ratings as individuals and as members of a virtual aggregation group. A compliance rating may be derived from the compliance data. For example, a compliance rating for a participant may be calculated by dividing the number of committed pricing agreements into which the participant is compliant by the total number of committed pricing agreements into which the participant has entered. In some embodiments, the compliance rating may be further weighted based on how close the participant was to achieving compliance for each contract (e.g., reaching a 89% market share commitment level for a CPA that required 90% market share might result in less of an impact on the participant's compliance rating than reaching a 20% market share commitment level for a CPA that required 70% market share), by the length of each contract (e.g., achieving compliance over a 5 year contract term might impact the participant's compliance rating more than achieving compliance over a 1 year contract term), by how recent each instance of compliance/non-compliance occurred, and the like. In some embodiments, compliance data may be weighted based on the size of the CPA associated with the compliance (e.g., based on the dollars of spending associated with the CPA). For example, a CPA associated with $1,000,000 in spending might be weighted more heavily for determining a compliance rating than a CPA with $10,000 in spending.

The supplier shipment data 716 may be used to determine a shipment rating for the supplier. For example, the shipment data 716 may indicate which products were shipped by a supplier, when the shipments occurred, to which buyer the shipment was sent, and in response to which purchase order or invoice the shipment was created. The shipment data 716 may also indicate the occurrence of backorders or product recalls. Suppliers may be assigned a shipment rating based on how frequently shipments occur within a particular period of time from a corresponding purchase order. The shipment rating may be reduced in response to detection of a product recall or detection of a failure to provide a product to distributors in a timely manner (e.g., backordered due to the supplier).

The distributor data 718 may be used to determine ratings for particular distributors. The distributor data 718 may indicate the shipment fee charged by the distributor to deliver the supplier's products, the delay associated with using a particular distributor (e.g., by determining the time from when the supplier ships a particular product to when the product is received by the buyer), whether or not the distributor ever substitutes an alternative product for a supplier's product (which may impact the buyer's market-share compliance level), or the like. Embodiments may further differentiate between supplier backorders and distributor backorders by leveraging access to data provided by the market platform.

The various data may be processed using a set of parameter weights 710. The parameter weights 710 may define different formulae, metrics, weights, and the like that are used to determine rating data 720 for the participants. These parameter weights 710 may define a single "absolute" rating for each participant using a standard formula/algorithm. For example, the market platform may utilize a standard scoring algorithm for determining a rating for a buyer, using various performance metrics for buyers, a standard scoring algorithm for suppliers using supplier performance metrics, and a standard scoring algorithm for distributors using distributor performance metrics. These standard scoring algorithms may be generated using a combination of one or more ratings for particular performance characteristics. For example, a single buyer rating could be derived by averaging a buyer compliance rating, a buyer RFP follow-through rating, a buyer purchase plan deviation rating, and a buyer CPA rating together to arrive at a uniform buyer rating. Additionally or alternatively, the various ratings and metrics might be accorded different weights by the market platform, and various methods of calculating the participant ratings may be employed.

In some embodiments, participants may alter the parameter weights 710 to generate custom ratings. For example, a particular supplier may wish to place more emphasis on buyer sales volume than past buyer compliance, and as such the seller may increase the weight accorded to the sales volume of the buyer and decrease the impact of the buyer's past compliance on the rating in the calculation used by the ratings engine to determine the buyer rating. In some embodiments, the ratings engine 702 may provide an interface (e.g., the buyer interface, the supplier interface, or the distributor interface described above with respect to FIG. 2) to allow the participant to modify the parameter weights to create a custom rating algorithm. In some embodiments, the rating engine may further allow for the participant to specify particular behavior based on the ratings of other participants, such as altering a default pricing model for a buyer based on the buyer's rating (e.g., giving more favorable pricing for highly rated buyers). It should be appreciated that the rating engine 702 may preserve the "raw" values of data used to derive custom ratings. These parameter weights 710 may therefore provide the capability to alter the calculation of the rating based on the needs or desires of the particular participant.

The rating data 720 may include a rating for each participant expressed in a variety of different manners. For example, the rating data may be represented as a numerical value from 0 to 1000, a percentage value, a letter grade (e.g., A-F), or a percentile value (e.g., the participant is in the $60^{th}$ percentile of all participants of the same type (e.g., buyer, supplier, distributor)), or a qualitative value (e.g., "Low", "Medium", or "High"). In some embodiments, the rating data may be expressed for the participant according to various filters. For example, the rating data may be expressed as a percentile with respect to all buyers/suppliers/ distributors, as a percentile for participants of a similar size (e.g., number of employees), as a percentile for participants in the same geographic area, as a percentile for participants with a particular spend volume, or the like.

FIGS. 8-11 depict some example methods that may be employed by the market platform to enable buyers to form, manage, and/or participate in virtual aggregation groups. As described above, these virtual aggregation groups may provide their members with increased discount levels than the individual members would otherwise be able to achieve. Although these methods are provided as examples, it should be readily appreciated that the market platform may provide a variety of additional and alternative tools and capabilities to assist buyers with participation in and management of their membership in virtual aggregation groups.

FIG. 8 depicts a flow diagram illustrating an example method 800 for implementing a virtual aggregation group in accordance with some example embodiments. As described above, virtual aggregation groups allow a multiple buyers to contract with suppliers as a single entity. From the perspective of the supplier, the virtual aggregation group may operate as a single entity, with compliance reporting to the supplier performed at the group level, as the supplier may not be concerned with the compliance or spending volume of individual members, while buyers are made aware of their compliance at an individual level and compliance bonuses/penalties are enforced according to the targets met by the individual buyers. Internally to the virtual aggregation group, compliance may be reported to other members of the group and the impact of meeting or failure to meet compliance goals established for the group may be applied to group members in proportion to the compliance achieved by particular group members. In other embodiments, compliance may be completely transparent to buyers, with buyers unaware of the impact of their membership in the virtual aggregation group other than the increased discounts they are provided. The method 800 describes an example process for establishing and participating in a virtual aggregation group in accordance with example embodiments of the present invention. The method 800 may be implemented by a market platform, such as the market platform server 202 described with respect to FIG. 2.

At action 802, a virtual aggregation group is established. The virtual aggregation group may be established by at least two buyers agreeing to form a group to present themselves to suppliers as a single entity for the purpose of entering supply contracts. Additionally or alternatively, the market platform may establish a virtual aggregation group by identifying particular buyers as candidates for the virtual aggregation group. For example, the market platform may examine buyer bid calendars to identify buyers with the same or similar contracting schedules in a particular category, the market platform may examine buyer ratings to identify buyers with particular ratings (e.g., above a certain threshold or similar to other buyers with similar bid calendar schedules), by examining buyer purchasing efficiencies (e.g., suggesting an aggregation group to a group of buyers which each stand to gain a similar amount of discount benefit by renegotiating their spend in a category), or the like. Although establishing the aggregation group is described as a discrete step with respect to action 802, it should be appreciated that embodiments may allow members to join or leave the aggregation group at various times. For example, a member may join a virtual aggregation group after one or more contracts are established, though the spending of the member (and the attendant access to compliance or sales volume based discounts) may not be tracked against the virtual aggregation group until the member enters into a contract on behalf of the virtual aggregation group (e.g., the next round of contracting negotiations after the expiration of the current contracts). An example method for establishing a virtual aggregation group is described further below with respect to FIG. 9.

At action 804, the method facilitates a group contracting operation. The group contracting operation may include several commonalities with a contracting operation performed by a single buyer. However, the group contracting operation may also take into account the needs and desires of individual members of the contracting group, allowing individual members to commit to their preferred contract parameters. Suppliers may also be presented with the ability to review the aggregate commitments of the group members in response to a pricing proposal to ensure that the commitments offered by the group are in line with the supplier's expectations. In this manner, the group contracting process allows group members and suppliers to make contracting decisions to ensure favorable pricing terms for the buyers while also providing a necessary "critical mass" of buyers and/or spend volume to make the group contracting operation worthwhile to the supplier. The contracting process may include members of the virtual aggregation group submitting individual or "prospective" RFPs which are combined into a group RFP to provide suppliers information about the potential spend of the group. The suppliers may construct pricing responses based on the group RFP and predicted spending indicated by the group RFP. Buyers may generate potential contracts upon receiving the pricing responses provided by the suppliers. The market platform may evaluate whether the contract selections provided by the members of the virtual aggregation group meet a minimum threshold to support the pricing response provided by the supplier. An example method for performing the group contracting operation is described further below with respect to FIG. 10.

At action 806, compliance with the terms of the group contracting operation established at action 804 is monitored. As described above with respect to a single buyer contracting operation, compliance for the group may be determined by aggregating the spending from each member of the group that joined the group contracting operation. As such, compliance may be monitored at the level of both individual buyers and the group of buyers as a whole. Compliance targets for the virtual aggregation group may be tied to a committed pricing agreement or agreements in a similar manner as for a single buyer, with particular sales volumes and market share targets established for the group's spending as a whole.

At optional action 808, the impact of the group's compliance may be apportioned to members of the group based on the member's particular compliance. For example, if the group fails to meet a compliance goal primarily due to a failure of one particular group member to fulfill their agreed-upon compliance obligation, then that member may be penalized (e.g., forced to pay a true-up payment to the supplier, or forced to reimburse other group members for a discount that the group failed to reach as a result of the penalized member) based on their "fault" with respect to the failure to meet the compliance obligation. An example method for measuring and enforcing compliance obligations in virtual aggregation groups is described further below with respect to FIG. 11. In scenarios where buyers are unaware of the performance of other members of the aggregation group, then the compliance of one buyer may not impact the pricing available to other buyers. To facilitate this, the market platform may enforce a compliance buffer to reduce the risk of the non-compliance of one buyer affecting the pricing of another buyer. This buffer may serve to insulate compliant buyers from having their discounts impacted by a failure to comply by other buyers in the virtual aggregation group.

FIG. 9 depicts a flow diagram illustrating an example method 900 for forming a virtual aggregation group in accordance with some example embodiments. As described above, the market platform server 202 may provide the ability for buyers using the market platform to form or join virtual aggregation groups with one another to improve the bargaining power of the buyers in negotiations with suppliers. Formation of these virtual aggregation groups may be triggered based on a variety of factors. The method 900 describes several of these triggers that may result in the formation or suggestion of formation of a virtual aggregation group. It should be appreciated that while many of the examples provided herein relate to initial formation of a virtual aggregation group, the same or similar triggers could be employed to invite a buyer to a previously existing virtual aggregation group.

At action 902, formation of a virtual aggregation group may be triggered based on an indicator received from a buyer. For example, the buyer may have an awareness of their spending volume and purchase needs and determine that it would be to their advantage to join a virtual aggregation group to improve their bargaining position for a particular product or category of products. In some embodiments, the market platform may provide data to buyers to assist them with deciding to join a virtual aggregation group, such as by providing the buyer with information on the discounts offered by suppliers to buyers who are members of aggregation group compared to the prices currently being offered to the buyer. In some embodiments, the buyer may generate a request or advertisement using the market platform to notify other buyers of their interest in joining or forming a virtual aggregation group. In some embodiments, the buyer may specify particular criteria for joining the group or for their desired group, such as a minimum spending volume in the particular category, a particular buyer type (e.g., profit vs. non-profit, hospital vs. solo practitioner, specialist vs. general practitioner), a buyer size (e.g., less than 10 employees, greater than 100 employees), or the like.

At action 904, a virtual aggregation group may alternatively or additionally be triggered based on an indicator received from a supplier. For example, a supplier may not wish to engage with numerous smaller contracts with a number of buyers, and instead suggest the buyers join together in a group to streamline the contracting process. In some embodiments, the supplier may provide an indication of an additional discount level the supplier is willing to offer members of a virtual aggregation group. In some embodiments, the supplier may provide certain requirements for the virtual aggregation group, such as a minimum number of buyers, a minimum aggregate spend volume, or the like. The supplier may also indicate particular buyers whom the supplier would like to see enter a virtual aggregation group together. In some embodiments, the supplier may establish a minimum rating for a virtual aggregation group or for members of the virtual aggregation group, reflecting a desire to deal with buyers of a certain caliber.

At action 906, a virtual aggregation group may alternatively or additionally be suggested by the market platform itself. For example, the market platform may determine that several buyers have a contract for a particular product or product category expiring at about the same time. The market platform may suggest that these buyers consider a virtual aggregation group to maximize their bargaining power for the new contract term. The market platform may also utilize various additional or alternative criteria for suggesting formation of a virtual aggregation group. For example, the market platform may suggest formation of a virtual aggregation group to buyers of a similar size, with a similar spend volume, with similar buyer ratings, with similar contracting preferences, within the same area, or the like.

At action 908, the opportunity to join the virtual aggregation group is provided to qualifying buyers. As described above, some virtual aggregation groups may be requirements that are not met by all buyers, as established by the market platform, buyers, or suppliers initiating the virtual aggregation group formation. Embodiments may thus only provide a notification of the ability to join the virtual aggregation group to buyers that qualify for membership (e.g., buyers that have at least a minimum rating, buyers that have at least a minimum spend volume). Additionally or alternatively, some virtual aggregation groups may be "open" groups that allow any interested buyers to join or to apply for membership. Some virtual aggregation groups may include a voting process whereby prospective members are admitted to the group only upon a vote of the current members of the group. Providing the opportunity to join the virtual aggregation group may include presenting the particular buyer with an interface allowing them to confirm they wish to apply to join or consent to join the group.

At action 910, an indicator of assent to join the group is received from a particular buyer. For example, the buyer may respond affirmatively to an invitation from another buyer, a supplier, or the market platform to join a newly established or existing virtual aggregation group. Upon agreeing to join the group, the group may be established at action 912. Establishing of the virtual aggregation group may also include determination of one or more group rules, such as the process by which compliance will be enforced. In some embodiments, these rules may be determined prior to establishing the group, such as at the time the group formation trigger occurs, such as at action 902, 904, or 906. These rules may be formalized via legal instruments generated and/or executed by the market platform. For example, these legal instruments may include standard terms and conditions established by the market platform for agreements among buyers. In some embodiments, establishment of the virtual aggregation group may include assigning a rating to the virtual aggregation group based on characteristics of the buyers. For example, a rating for the virtual aggregation group may be a simple average of ratings of the members, or an average with values weighted by the spend volume of each member relative to the spend volume of the group, or various other methods of calculating a quality or risk rating for the particular virtual aggregation group that allows a counter-party (e.g., suppliers) to evaluate the virtual aggregation group.

Once the virtual aggregation group has been established the virtual aggregation group may begin contracting operations with one or more suppliers. In circumstances where the group members are unaware of one another, the market platform may analyze contract requests from members of the virtual aggregation group and submit contracts to suppliers only after reaching a minimum threshold of spending. In some embodiments, initial establishment of the virtual aggregation group does not bind individual group members to decisions made by the group. An example method for enabling group members to make contracting decisions and to opt out of the group is described further below with respect to FIG. 11.

FIG. 10 depicts a flow diagram illustrating an example method for allowing a buyer to transparently join a virtual aggregation group in accordance with some example embodiments. As described above, example embodiments may provide buyers with the ability to join virtual aggregation groups to obtain the benefit of the increased purchasing power of a virtual aggregation group, without requiring the formal relationship and oversight required among buyers for aggregation groups formed without the benefit of a market platform system. These virtual aggregation groups may be formed dynamically by the market platform based on various factors, including but not limited to grouping together buyers with similar spending in a particular categories, buyers with similar bid calendars, buyers with similar ratings, buyers with similar purchasing efficiencies, or the like. FIG. 10 illustrates an example of a method by which buyers may join or form these virtual aggregation groups.

At action 1002, the market platform may receive an indicator from a buyer that the buyer wishes to enter a virtual aggregation group. For example, the buyer may select an interface option (e.g., a checkbox or radio button) during generation of an RFP to include the RFP in a virtual aggregation group contracting process. Selection of this interface option may be the only act necessary by the buyer to participate in the virtual aggregation group, as the market platform may manage the buyer's membership and participation in the group.

At action 1004, the market platform may assign the buyer to a particular virtual aggregation group. As described above, the buyer may be grouped with other buyers of a similar size, purchasing history, or purchasing calendar, with buyers of a similar ratings, or by any other characteristics that may provide indications to the market platform as to how the buyers should be grouped together. In some embodiments, the buyer may have input on how they are assigned to a virtual aggregation group (e.g., indicating preferences for joining a group with buyers of a particular size or rating), while in other embodiments the buyer may be assigned to a virtual aggregation group without any additional input and at the discretion of the market platform.

At action 1006, the market platform may initiate an RFP on behalf of the virtual aggregation group. As described above, although suppliers may receive a group RFP representing the entire group and provide a single pricing response, buyers may still contract with the suppliers on an individual basis. An example embodiment of a method for managing contracting operations for buyers operating within an RFP is described further below with respect to FIG. 11.

FIG. 11 depicts a flow diagram illustrating an example method 1100 for entering into a committed pricing agreement by a virtual aggregation group in accordance with some example embodiments. As described above, the contracting process for a virtual aggregation group may be modified from the process performed by a single buyer in order to ensure that buyers maintain a certain level of autonomy during the group contracting process. Embodiments may thus allow for group members to make their own selections with respect to supplier pricing proposals to ensure the buyers are not forced to agree to undesirable contract terms or commitments by the other members of the virtual aggregation group.

At action 1102, a group RFP is generated on behalf of the virtual aggregation group. The group RFP may be generated for a particular product or product category automatically when the group is established, or the group RFP may be generated in response to a vote by a plurality of group members. The group RFP may indicate to suppliers that number of buyers in the virtual aggregation group, the product or category products to which the group RFP pertains, the expected spend volume of the members of the virtual aggregation group, or any other information useful to assist the suppliers with preparing a pricing proposal in response to the group RFP. The group RFP may also impose certain requirements on the buyers. For example, the group RFP may specify uniform contract terms, such as a single contract duration that defines the length of the virtual aggregation group relationship for the members of the group. However, embodiments may also allow for non-uniform commitments, such as different contract durations across different group members.

At action 1104, a pricing proposal is received from one or more suppliers in response to the group RFP. The pricing proposal may include pricing for one or more products or product categories, along with discount information for various contract terms and commitments, as described above with respect to a single buyer contracting operation in FIGS. 4-6.

At action 1106, the members of the group make selections from the pricing proposals based on their desired contracting terms and commitments. For example, different buyers may feel comfortable agreeing to different market share commitments or spending volumes. These pricing proposal selections may be aggregated to determine the overall commitment levels offered to the supplier in aggregate. In some embodiments, these selections must be provided by group members within a limited time period (e.g., 72 hours) to ensure that members of the group provide their selections in a timely manner so as not to delay the contracting process for the remainder of the group members.

At action 1108, the selected terms and commitments from the buyers are aggregated and a determination is made as to whether the aggregated commitment levels meet a minimum requirement such as may be established by the supplier. For example, a supplier may indicate that their pricing proposal to the virtual aggregation group is contingent on meeting a minimum spend volume and/or market share commitment. The selected terms and commitments from buyers that wish to contract with the particular seller may thus be aggregated to determine if the aggregate commitments meet any minimum thresholds established by the supplier. In the event that these minimum thresholds are met, the supplier may be obligated by the market platform to engage in the contract at the negotiated terms. In some embodiments, the minimum threshold requirements may just be minimum requirements to present the proposals to the supplier, and the supplier may still have the option to confirm the agreement at those terms before the contract is complete. In some embodiments, buyers that choose a supplier other than a supplier selected by the rest of the group, or some majority or other portion thereof, may be removed from the virtual aggregation group. In this manner, buyers that select alternative suppliers are not bound by the agreement to use the supplier agreed upon by the remainder of the group, ensuring that buyers still have freedom of choice even in the event of a disagreement with the rest of the virtual aggregation group. The method may return to 1102 to generate a new group RFP if the buyers cannot meet any minimum requirements of a particular supplier selected by the group members.

At action 1112, the selections made by the buyers may be presented to the supplier if the group's selections meet the supplier's requirements. At action 1114, the supplier may be presented with the opportunity to confirm the terms of the agreement based upon the aggregated selections of the members of the virtual aggregation group. If the supplier rejects the terms offered by the group, the method may return to action 1102. Otherwise, at action 1116, a group committed pricing agreement may be confirmed and the compliance monitoring based on the group committed pricing agreement may begin. An example method for monitoring and enforcing compliance in a virtual aggregation group is provided below with respect to FIG. 12.

FIG. 12 depicts a flow diagram illustrating an example method 1200 for monitoring and enforcing compliance in a virtual aggregation group in accordance with some example embodiments. As described above, embodiments may provide for managing compliance both for a virtual aggregation group as a whole and for the individual members of the group. Different virtual aggregation groups may have different methods of dealing with non-compliance with terms of a group committed pricing agreement. For example, some virtual aggregation groups may apportion the risks and rewards of failing or succeeding in compliance goals equally across all members, while other virtual aggregation groups may choose to punish group members most responsible for failing to meet compliance goals and reward group members responsible for overachieving compliance targets. In other groups, compliance penalties and rewards may be apportioned based on the spending volume of the individual members of the group. As such, while, from the supplier's perspective, compliance goals and performance may appear as a single value with respect to the virtual aggregation group, the compliance of individual members may have direct bearing on the financial fortunes of those individual members. The method 1200 provides an example of a method for apportioning the impact of a particular compliance score across a virtual aggregation group in a consistent manner.

At action 1202, the spending of the members of the aggregation group is monitored. Individual buyer spending may be monitored in a similar way as described above with respect to FIGS. 2, 4, and 6, by monitoring buyer purchases using the market platform and/or extracting data from buyer records. At action 1204, the buyer spend data from the members of the aggregation group may be aggregated to determine a set of spend data for the aggregation group as a whole. At action 1206, a compliance rating may be determined for the aggregation group based on the aggregated spend data. This compliance rating may be used to derive the prices paid by the group as a whole, or used to determine if the group met the negotiated commitment level for the prices received by the group.

At action 1208, the compliance level is used to assess an impact (e.g., a penalty or reward owed by or to the group, respectively) of the compliance level on the group as a whole. For example, the impact may include payment of a difference between a negotiated price and a price associated with the actual compliance level reached by the group as described above with respect to a single buyer compliance enforcement operation as described with respect to FIGS. 3 and 6.

At action 1210, the impact of the compliance level is apportioned among the members of the virtual aggregation group. As described above, the impact may be apportioned among the group in various ways according to the provisions of the group determined during formation of the group. For example, the impact may be apportioned equally across all group members, across all group members according to the ratio of the member's spending volume compared to the group's spending volume as a whole, across group members according to how much influence the member had in assisting the group with meeting (or failing to meet) a particular spending target (e.g., heavily penalizing a group member that caused the group to fail to meet a commitment level), or any other method of determining which parties should be responsible for dealing with the impact of the compliance level. In some embodiments, apportionment of the impact may also include payment of a rebate or increased discount to members of the virtual aggregation group. For example, if the group meets a market share commitment level that requires the supplier to pay a rebate to the group, then the rebate may be apportioned across the group such that each buyer receives a share of the rebate commensurate with how much the buyer's spending assisted the group with meeting the goal. Additionally or alternatively, in some embodiments, excess compliance rewards may be apportioned to members of the group that did not meet the compliance goals. For example, if one particular buyer far exceeds their compliance goal, then the excess spending over the compliance goal may be apportioned to under compliant buyers to assist the under compliant buyers with meeting their goal. In some embodiments, this may result in under compliant buyers receiving rebates or additional discounts based on the compliance of other group members.

It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory 114 of an apparatus employing an embodiment of the present invention and executed by a processor 112 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

FIG. 13 depicts an illustration of an interface 1300 for allowing a buyer to join a virtual aggregation group in accordance with some example embodiments. As described above with respect to FIGS. 1-11, embodiments may allow for a buyer to "opt in" to joining a virtual aggregation group by selecting an interface control. The interface 1300 depicts an RFP generation interface that includes a set of radio buttons 1302 allowing a buyer to select whether they wish to initiate the RFP as an individual, as a member of a virtual aggregation group with compliance measured individually for each buyer, or as a member of a virtual aggregation group with compliance measured for the group as a whole. Upon initiation of the RFP, the RFP may be presented to suppliers according to the selection made by the buyer from the radio buttons 1302. For example, if the buyer selects the "single" button, the RFP may be generated on behalf of the buyer as an individual. If the buyer selects the "aggregate measured separate" button, then the RFP may be presented as part of a group RFP for a virtual aggregation group which includes separate compliance measurement for each member. The market platform may select a particular virtual aggregation group for the buyer in response to performing the RFP with the appropriate radio button selected, such as by assigning the buyer to a virtual aggregation group with other buyers with similar spending, buyers of a similar size, buyers with a similar rating, or the like. As described above, virtual aggregation groups with compliance measured separately may ensure that buyers are not penalized for failure of the group as a whole to meet compliance targets, and that buyers are only impacted by their own compliance performance. Similarly to the radio button for "aggregate measured separately", selection of the "aggregate measured joint" may cause the market platform to assign the buyer to a virtual aggregation group that includes joint measurement of compliance. As described above, virtual aggregation groups with joint compliance measurement may have the impact of meeting or failing to meet compliance targets by the group as a whole, such that buyers may be rewarded or penalized based on the performance of other members in the group.

FIG. 14 depicts an illustration of an interface 1400 for receiving an invitation to join a virtual aggregation group in accordance with some example embodiments. The interface 1400 depicts a "dashboard" interface that a buyer may, for example, see upon logging in to the market platform. This dashboard may provide the buyer with status updates related to the market platform, such as reminding the buyer of contract deadlines, notifying the buyer of pricing proposals received from RFPs, notifying the buyer of possible savings in particular categories, and the like. In the present example, the buyer has received an invitation 1402 to join a particular aggregation group. As described above, buyers may be notified of and/or invited to aggregation groups by the market platform itself, by other buyers, or by suppliers. In the present example, the buyer may select the "Join Group" button of the invitation 1402 to join the "Upper Midwest CSC" virtual aggregation group. Upon selecting the join group button, the buyer may be presented with another interface allowing the buyer to generate an RFP as a member of the group, such as the interface 1300 described above.

FIG. 15 depicts an illustration of an interface 1500 for responding to an RFP generated by a virtual aggregation group in accordance with some example embodiments. As described above, suppliers may receive virtual aggregation group RFPs as a single RFP. Upon receipt of such an RFP, suppliers may be presented with information 1502 about the virtual aggregation group. For example, the supplier may be presented with the total possible spend for the virtual aggregation group, the average spend per member of the virtual aggregation group, the virtual aggregation group's current spend with the supplier, and the like. In some embodiments, the supplier may establish a threshold spending volume that the group must meet to obtain a certain pricing discount level using the interface 1500. In other embodiments, the market platform may establish the threshold spending volume separately for the group.

FIG. 16 depicts an illustration of an interface 1600 for viewing virtual aggregation group compliance in accordance with some example embodiments. The interface 1600 may correspond to an interface provided to suppliers or to members of the virtual aggregation group to allow the supplier or members to monitor whether the group is meeting market share commitment levels.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   establishing a virtual aggregation group comprising at least two members;
   receiving an indication of a market share commitment of the virtual aggregation group, the market share commitment representing a cumulative market share provided to at least one supplier by the virtual aggregation group, wherein the cumulative market share is defined as a percentage of spending by the members of the virtual aggregation group with the at least one supplier within at least one product category, divided by total aggregate spending of the members of the virtual aggregation group within the at least one product category;
   generating, using a processor, a committed pricing agreement between the virtual aggregation group and at least one supplier, the committed pricing agreement comprising compliance terms that determine at least one price parameter for a product purchase by the at least two members of the virtual aggregation group from the supplier based on the market share commitment of the virtual aggregation group;
   monitoring spending of the members of the virtual aggregation group within the at least one product category with the at least one supplier and with one or more additional suppliers other than the at least one supplier, by analyzing electronic transactions performed by the members of the virtual aggregation group using a market platform;

determining, using the monitored spending, whether the virtual aggregation group has met the market share commitment by at least:

calculating a group market share by at least:
    determining a market share of each member of the virtual aggregation group spent with the at least one supplier within the at least one product category;
    weighting the market share of each member by a total spending of the each member within the at least one product category to determine a plurality of weighted market shares; and
    calculating the group market share as a weighted average using the plurality of weighted market shares; and comparing the calculated group market share to the market share commitment;

notifying at least one of the supplier or the members of the virtual aggregation group of whether the virtual aggregation group has met the market share commitment; and adjusting the price parameter based on whether the virtual aggregation group has met the market share commitment, whether the virtual aggregation group has failed to meet the market share commitment, or whether the virtual aggregation group has exceeded the market share commitment.

2. The method of claim 1, further comprising determining an impact on the virtual aggregation group based on the adjustment of the price parameter.

3. The method of claim 2, further comprising apportioning the impact to the members of the virtual aggregation group based on an apportionment rule.

4. The method of claim 3, wherein the apportionment rule comprises at least one of apportioning the impact based on a spend volume of the member, apportioning the impact based on the member's effect on group compliance, or apportioning the impact equally to each member of the virtual aggregation group.

5. The method of claim 3, wherein the apportionment rule comprises apportioning the impact differently across two or more of the members of the virtual aggregation group.

6. The method of claim 1, further comprising generating a group request for pricing on behalf of the virtual aggregation group.

7. The method of claim 1, further comprising:
receiving a virtual aggregation group initiation trigger;
sending an invitation to at least one buyer in response to receiving the virtual aggregation group initiation trigger;
receiving an indication of assent from the buyer; and
adding the buyer to the virtual aggregation group as one of the members of the virtual aggregation group.

8. The method of claim 1, wherein at least one of the at least two members is a member of a plurality of virtual aggregation groups, wherein the plurality of virtual aggregation groups includes the virtual aggregation group and at least two of the plurality of virtual aggregation groups have different members.

9. The method of claim 8, wherein each of the plurality of virtual aggregation groups is associated with a different product category.

10. A method comprising:
generating, using a processor, a group request for pricing (RFP) for a virtual aggregation group comprising a plurality of members;
receiving at least one pricing proposal from at least one supplier, the at least one pricing proposal comprising compliance terms that determine at least one price parameter for a product purchase, wherein the compliance terms comprise a market share commitment representing a cumulative market share provided to the supplier by the virtual aggregation group, wherein the cumulative market share is defined as a percentage of spending by the virtual aggregation group with the at least one supplier within at least one product category, divided by total aggregate spending of the virtual aggregation group within the at least one product category;
providing the at least one pricing proposal to the plurality of members;
receiving an indication of agreement to the pricing proposal from at least one of the plurality of members, the indication of agreement comprising the market share commitment;
generating a committed pricing agreement in response to receiving the indication of agreement
initiating monitoring of spending of the members of the virtual aggregation group within the at least one product category with the at least one supplier and with one or more additional suppliers other than the at least one supplier, by analyzing electronic transactions performed by the members of the virtual aggregation group using a market platform;
determining, using the monitored spending, whether the virtual aggregation group has met the market share commitment by at least:
calculating a group market share by at least:
    determining a market share of each member of the virtual aggregation group spent with the at least one supplier within the at least one product category;
    weighting the market share of each member by a total spending of the each member within the at least one product category to determine a plurality of weighted market shares; and
    calculating the group market share as a weighted average using the plurality of weighted market shares; and
comparing the calculated group market share to the market share commitment; and
adjusting the price parameter based on whether the virtual aggregation group has met the market share commitment, whether the virtual aggregation group has failed to meet the market share commitment, or whether the virtual aggregation group has exceeded the market share commitment.

11. The method of claim 10, further comprising only generating the committed pricing agreement in response to at least a threshold number of the plurality of members agreeing to the pricing proposal.

12. The method of claim 10, further comprising only generating the committed pricing agreement in response to a spend volume of members agreeing to the pricing proposal exceeding a threshold spend volume.

13. The method of claim 10, further comprising providing the supplier with an opportunity to reject the committed pricing agreement.

14. The method of claim 10, further comprising establishing a time period for response to the pricing proposal for the members of the virtual aggregation group.

15. The method of claim 14, wherein the time period is 72 hours.

16. An apparatus comprising at least one memory coupled to at least one processor, the memory storing a set of program instructions that, when executed by the processor, configure the apparatus to:
- establish a virtual aggregation group comprising at least two members;
- receive an indication of a market share commitment of the virtual aggregation group, the market share commitment representing a cumulative market share provided to at least one supplier by the virtual aggregation group, wherein the cumulative market share is defined as a percentage of spending by the members of the virtual aggregation group with the at least one supplier within at least one product category, divided by total aggregate spending of the members of the virtual aggregation group within the at least one product category;
- generate a committed pricing agreement between the virtual aggregation group and at least one supplier, the committed pricing agreement comprising compliance terms that determine at least one price parameter for a product purchase by the at least two members of the virtual aggregation group from the supplier based on the market share commitment of the virtual aggregation group;
- monitor spending of the members of the virtual aggregation group within the at least one product category with the at least one supplier and with one or more additional suppliers other than the at least one supplier, by analyzing electronic transactions performed by the members of the virtual aggregation group using a market platform;
- determine, using the monitored spending, whether the virtual aggregation group has met the market share commitment by at least:
- calculating a group market share by at least:
  - determining a market share of each member of the virtual aggregation group spent with the at least one supplier within the at least one product category;
  - weighting the market share of each member by a total spending of the each member within the at least one product category to determine a plurality of weighted market shares; and
  - calculating the group market share as a weighted average using the plurality of weighted market shares; and
- comparing the calculated group market share to the market share commitment;
- notify at least one of the supplier or the members of the virtual aggregation group of whether the virtual aggregation group has met the market share commitment; and adjust the price parameter based on whether the virtual aggregation group has met the market share commitment, whether the virtual aggregation group has failed to meet the market share commitment, or whether the virtual aggregation group has exceeded the market share commitment.

17. The apparatus of claim 12, further configured to determine an impact on the virtual aggregation group based on the adjustment of the price parameter.

18. The apparatus of claim 17, further configured to apportion the impact to the members of the virtual aggregation group based on an apportionment rule.

19. The apparatus of claim 18, wherein the apportionment rule comprises at least one of apportioning the impact based on a spend volume of the member, apportioning the impact based on the member's effect on group compliance, or apportioning the impact equally to each member of the virtual aggregation group.

20. The apparatus of claim 16, further configured to generate a group request for pricing on behalf of the virtual aggregation group.

21. The apparatus of claim 16, further configured to:
- receive a virtual aggregation group initiation trigger;
- send an invitation to at least one buyer in response to receiving the virtual aggregation group initiation trigger;
- receive an indication of assent from the buyer; and
- add the buyer to the virtual aggregation group as one of the members of the virtual aggregation group.

22. An apparatus comprising at least one memory coupled to at least one processor, the memory storing a set of program instructions that, when executed by the processor, configure the apparatus to:
- generate a group request for pricing (RFP) for a virtual aggregation group comprising a plurality of members;
- receive at least one pricing proposal from at least one supplier, the at least one pricing proposal comprising compliance terms that determine at least one price parameter for a product purchase, wherein the compliance terms comprise a market share commitment, the market share commitment representing a cumulative market share provided to the supplier by the members of the virtual aggregation group, wherein the cumulative market share is defined as a percentage of spending by the virtual aggregation group with the at least one supplier within at least one product category, divided by total aggregate spending of the virtual aggregation group within the at least one product category;
- provide the at least one pricing proposal to the plurality of members;
- receive an indication of agreement to the pricing proposal from at least one of the plurality of members, the indication of agreement comprising the market share commitment;
- generate a committed pricing agreement in response to receiving the indication of agreement;
- initiate monitoring of spending of the members of the virtual aggregation group within the at least one product category with the at least one supplier and with one or more additional suppliers other than the at least one supplier, by analyzing electronic transactions performed by the members of the virtual aggregation group using a market platform;
- determine, using the monitored spending, whether the virtual aggregation group has met the market share commitment by at least:
- calculating a group market share by at least:
  - determining a market share of each member of the virtual aggregation group spent with the at least one supplier within the at least one product category;
  - weighting the market share of each member by a total spending of the each member within the at least one product category to determine a plurality of weighted market shares; and
  - calculating the group market share as a weighted average using the plurality of weighted market shares; and
- comparing the calculated group market share to the market share commitment; and
- adjust the price parameter based on whether the virtual aggregation group has met the market share commitment, whether the virtual aggregation group has failed to meet the market share commitment, or whether the virtual aggregation group has exceeded the market share commitment.

23. The apparatus of claim 22, further configured to only generate the committed pricing agreement in response to at least a threshold number of the plurality of members agreeing to the pricing proposal.

24. The apparatus of claim 22, further configured to only generating the committed pricing agreement in response to a spend volume of members agreeing to the pricing proposal exceeding a threshold spend volume.

25. The apparatus of claim 22, further configured to provide the supplier with an opportunity to reject the committed pricing agreement.

26. The apparatus of claim 22, further configured to establish a time period for response to the pricing proposal for the members of the virtual aggregation group.

27. The apparatus of claim 26, wherein the time period is 72 hours.

28. A non-transitory computer readable storage medium comprising instructions that, when executed by a processor, configure an apparatus to:
   establish a virtual aggregation group comprising at least two members;
   receive an indication of a market share commitment of the virtual aggregation group, the market share commitment representing a cumulative market share provided to at least one supplier by the virtual aggregation group, wherein the cumulative market share is defined as a percentage of spending by the members of the virtual aggregation group with the at least one supplier within at least one product category, divided by total aggregate spending of the members of the virtual aggregation group within the at least one product category;
   generate a committed pricing agreement between the virtual aggregation group and at least one supplier, the committed pricing agreement comprising compliance terms that determine at least one price parameter for a product purchase by the at least two members of the virtual aggregation group from the supplier based on the market share commitment;
   monitor spending of the members of the virtual aggregation group within the at least one product category with the at least one supplier and with one or more additional suppliers other than the at least one supplier, by analyzing electronic transactions performed by the members of the virtual aggregation group using a market platform;
   determine, using the monitored spending, whether the virtual aggregation group has met the market share commitment by at least:
      calculating a group market share by at least:
         determining a market share of each member of the virtual aggregation group spent with the at least one supplier within the at least one product category;
         weighting the market share of each member by a total spending of the each member within the at least one product category to determine a plurality of weighted market shares; and
         calculating the group market share as a weighted average using the plurality of weighted market shares; and
      comparing the calculated group market share to the market share commitment;
   notify at least one of the supplier or the members of the virtual aggregation group of whether the virtual aggregation group has met the market share commitment; and
   configure the apparatus to adjust the price parameter based on whether the virtual aggregation group has met the market share commitment, whether the virtual aggregation group has failed to meet the market share commitment, or whether the virtual aggregation group has exceeded the market share commitment.

29. The computer readable storage medium of claim 28, further comprising instructions to configure the apparatus to determine an impact on the virtual aggregation group based on the adjustment of the price parameter.

30. The computer readable storage medium of claim 29, further comprising instructions to configure the apparatus to apportion the impact to the members of the virtual aggregation group based on an apportionment rule.

31. The computer readable storage medium of claim 30, wherein the apportionment rule comprises at least one of apportioning the impact based on a spend volume of the member, apportioning the impact based on the member's effect on group compliance, or apportioning the impact equally to each member of the virtual aggregation group.

32. The computer readable storage medium of claim 28, further comprising instructions to configure the apparatus to generate a group request for pricing on behalf of the virtual aggregation group.

33. The computer readable storage medium of claim 28, further comprising instructions to configure the apparatus to:
   receive a virtual aggregation group initiation trigger;
   send an invitation to at least one buyer in response to receiving the virtual aggregation group initiation trigger;
   receive an indication of assent from the buyer; and
   add the buyer to the virtual aggregation group as one of the members of the virtual aggregation group.

34. A non-transitory computer readable storage medium comprising instructions that, when executed by a processor, configure an apparatus to:
   generate a group request for pricing (RFP) for a virtual aggregation group comprising a plurality of members;
   receive at least one pricing proposal from at least one supplier, the at least one pricing proposal comprising compliance terms that determine at least one price parameter for a product purchase, wherein the compliance terms comprise a market share commitment representing a cumulative market share provided to the supplier by the virtual aggregation group, wherein the cumulative market share is defined as a percentage of spending by the virtual aggregation group with the at least one supplier within at least one product category, divided by total aggregate spending of the virtual aggregation group within the at least one product category;
   provide the at least one pricing proposal to the plurality of members;
   receive an indication of agreement to the pricing proposal from at least one of the plurality of members;
   generate a committed pricing agreement in response to receiving the indication of agreement;
   initiate monitoring of spending of the members of the virtual aggregation group by analyzing electronic transactions performed by the members of the virtual aggregation group using a market platform in response to generating the committed pricing agreement;

determine, using the monitored spending, whether the virtual aggregation group has met the market share commitment by at least:
calculating a group market share by at least:
determining a market share of each member of the virtual aggregation group spent with the at least one supplier within the at least one product category;
weighting the market share of each member by a total spending of the each member within the at least one product category to determine a plurality of weighted market shares; and
calculating the group market share as a weighted average using the plurality of weighted market shares; and
comparing the calculated group market share to the market share commitment; and
configure the apparatus to adjust the price parameter based on whether the virtual aggregation group has met the market share commitment, whether the virtual aggregation group has failed to meet the market share commitment, or whether the virtual aggregation group has exceeded the market share commitment.

35. The computer readable storage medium of claim 34, further comprising instructions to configure the apparatus to only generate the committed pricing agreement in response to at least a threshold number of the plurality of members agreeing to the pricing proposal.

36. The computer readable storage medium of claim 34, further comprising instructions to configure the apparatus to only generate the committed pricing agreement in response to a spend volume of members agreeing to the pricing proposal exceeding a threshold spend volume.

37. The computer readable storage medium of claim 34, further comprising instructions to configure the apparatus to provide the supplier with an opportunity to reject the committed pricing agreement.

38. The computer readable storage medium of claim 22, further comprising instructions to configure the apparatus to establish a time period for response to the pricing proposal for the members of the virtual aggregation group.

39. The computer readable storage medium of claim 38, wherein the time period is 72 hours.

* * * * *